United States Patent
Takaku et al.

(10) Patent No.: US 10,599,586 B2
(45) Date of Patent: Mar. 24, 2020

(54) INFORMATION PROCESSING APPARATUS, MEMORY CONTROL CIRCUITRY, AND CONTROL METHOD OF INFORMATION PROCESSING APPARATUS

(71) Applicant: FUJITSU LIMITED, Kawasaki-shi, Kanagawa (JP)

(72) Inventors: Kazuya Takaku, Kawasaki (JP); Fumitake Sugano, Taito (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 15/975,247

(22) Filed: May 9, 2018

(65) Prior Publication Data
US 2018/0329832 A1   Nov. 15, 2018

(30) Foreign Application Priority Data
May 15, 2017   (JP) .................. 2017-096342

(51) Int. Cl.
| | |
|---|---|
| G06F 12/00 | (2006.01) |
| G06F 12/14 | (2006.01) |
| G06F 12/10 | (2016.01) |
| G06F 9/30 | (2018.01) |
| G06F 12/12 | (2016.01) |
| G06F 13/16 | (2006.01) |
| G06F 3/06 | (2006.01) |

(52) U.S. Cl.
CPC ............ *G06F 12/14* (2013.01); *G06F 3/0629* (2013.01); *G06F 3/0683* (2013.01); *G06F 9/3001* (2013.01); *G06F 9/30047* (2013.01); *G06F 9/30145* (2013.01); *G06F 12/10* (2013.01); *G06F 12/12* (2013.01); *G06F 13/16* (2013.01); *G06F 2212/70* (2013.01)

(58) Field of Classification Search
None
See application file for complete search history.

(56) References Cited

U.S. PATENT DOCUMENTS

2018/0165207 A1* 6/2018 Yigzaw ............... G06F 11/2094

FOREIGN PATENT DOCUMENTS

JP   9-223064   8/1997

* cited by examiner

*Primary Examiner* — Midys Rojas
(74) *Attorney, Agent, or Firm* — Fujitsu Patent Center

(57) ABSTRACT

An information processing apparatus includes a processor, a plurality of memories, and a memory control circuitry coupled to the processor and the plurality of memories. The memory control circuitry controls access to the plurality of memories. The memory control circuitry includes a plurality of memory control circuits corresponding respectively to the plurality of memories, and a request distribution circuit that outputs the memory access request and a setting change request from the processor to one of the plurality of memory control circuits. Each of the plurality of memory control circuits includes an address translation control circuit that replaces bits of an address included in the memory access request based on allocation of bits changed based on the setting change request, and an access control circuit.

8 Claims, 16 Drawing Sheets

FIG.2

| | ALLOCATION OF BANK ADDRESS | BANK CONFIGURATION OF MEMORY AND MEMORY POSITION OF DATA |
|---|---|---|
| (A) | AD [4 3 2 1 0 / --- / BA] | MEMORY 3 (DATA GRANULARITY=1)<br>BA=0: BK0 [D1][D5][D9]---<br>BA=1: BK1 [D2][D6]---<br>BA=2: BK2 [D3][D7]---<br>BA=3: BK3 [D4][D8]--- |
| (B) | AD [4 3 2 1 0 / --- / BA] | MEMORY 3 (DATA GRANULARITY=2)<br>BA=0: BK0 [D1][D2]---[D9]<br>BA=1: BK1 [D3][D4]---<br>BA=2: BK2 [D5][D6]---<br>BA=3: BK3 [D7][D8]--- |
| (C) | AD [4 3 2 1 0 / --- / BA] | MEMORY 3 (DATA GRANULARITY=4)<br>BA=0: BK0 [D1][D2][D3][D4][D5][D6][D7][D8][D9]---<br>BA=1: BK1<br>BA=2: BK2<br>BA=3: BK3 |

FIG.13

INFORMATION PROCESSING APPARATUS, MEMORY CONTROL CIRCUITRY, AND CONTROL METHOD OF INFORMATION PROCESSING APPARATUS

CROSS-REFERENCE TO RELATED APPLICATION

This application is based upon and claims the benefit of priority of the prior Japanese Patent Application No. 2017-096342, filed on May 15, 2017, the entire contents of which are incorporated herein by reference.

FIELD

The embodiments discussed herein are related to an information processing apparatus, a memory control circuitry, and a control method of the information processing apparatus.

BACKGROUND

Adding a description to a program to acquire or release a memory area makes it possible to dynamically change the size of the memory area used for the program. However, this makes the program more complicated than before the addition of the description. To avoid this problem, there has been proposed a method of simplifying the description of a program by designating the size of a memory area to be used and an arbitrary number, calling a library function from the program, and securing the memory area in the called library function.

Related technologies are disclosed in, for example, Japanese Laid-Open Patent Publication No. 09-223064.

SUMMARY

According to an aspect of the embodiments, an information processing apparatus includes, a processor that executes arithmetic processing, a plurality of memories to which different addresses are allocated, and a memory control circuitry coupled to the processor and the plurality of memories. The memory control circuitry controls access to the plurality of memories based on a memory access request from the processor. The memory control circuitry includes, a plurality of memory control circuits corresponding respectively to the plurality of memories, and a request distribution circuit that outputs the memory access request and a setting change request from the processor to one of the plurality of memory control circuits. Each of the plurality of memory control circuits includes, an address translation control circuit that replaces bits of an address included in the memory access request based on allocation of bits changed based on the setting change request, and an access control circuit that accesses a memory corresponding to the own memory control circuit among the plurality of memories based on a memory access request with the address bits replaced by the address translation control circuit of the own memory control circuit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a view illustrating an example of access to a memory by a memory control circuit illustrated in FIG. 1;

FIG. 13 is a view illustrating the outline of a request queue control by a queue control circuit illustrated in FIG. 5;

DESCRIPTION OF EMBODIMENTS

In the meantime, processing such as a deep learning using a neural network is executed by, for example, a program executed by a processor included in an information processing apparatus. In this type of information processing apparatus, a memory control circuitry controlling access to a memory stores data in the memory or reads data from the memory according to an address included in a memory access request output by the processor. Data used in each layer of the neural network may be distributed and held in a plurality of memory areas of the memory depending on the data size. In the case where the data to be used for the processing are distributed and held in the plurality of memory areas, the efficiency of access to the memory becomes lower than that in a case where data are collectively held in one memory area, such as consecution of addresses of data.

Hereinafter, embodiments will be described with reference to the accompanying drawings.

Figure 1:
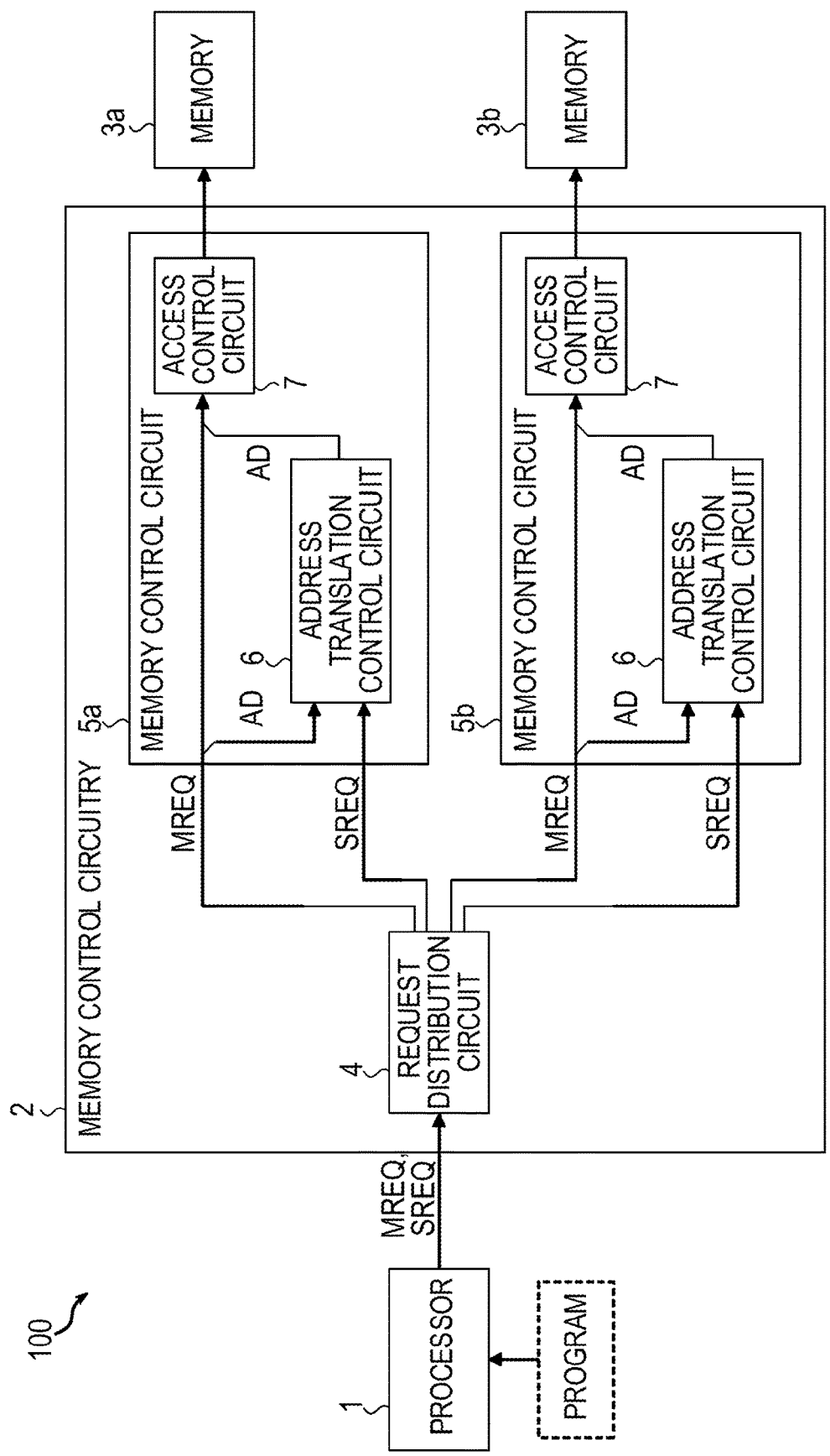
FIG. 1 is a view illustrating an information processing apparatus, a memory control circuitry, and a control method of the information processing apparatus according to an embodiment.

FIG. 1 illustrates an information processing apparatus, a memory control circuitry, and a control method of the information processing apparatus according to an embodiment. The information processing apparatus 100 illustrated in FIG. 1 is, for example, a server and includes a processor 1, a memory control circuitry 2, and a plurality of memories 3 (3a and 3b) to which different addresses AD are allocated.

The processor 1 executes arithmetic processing by executing an arithmetic instruction described in a program stored in, for example, another memory (not illustrated). Further, the processor 1 outputs a memory access request MREQ for reading/writing information such as data from/to the memories 3 to the memory control circuitry 2 based on a fetch of a memory access instruction (load instruction or store instruction) described in the program. Further, the processor 1 outputs a setting change request SREQ for changing the setting of the memory control circuitry 2 to the memory control circuitry 2 based on a fetch of a setting change instruction described in the program.

The memory control circuitry 2 includes a request distribution circuit 4 and a plurality of memory control circuits 5 (5a and 5b) corresponding respectively to the plurality of memories 3a and 3b. Note that the information processing apparatus 100 may have three or more memories 3, in which case the memory control circuitry 2 has three or more memory control circuits 5 corresponding respectively to the memories 3.

The request distribution circuit 4 outputs the memory access request MREQ and the setting change request SREQ, which are received from the processor 1, to one of the memory control circuits 5a and 5b. The setting change request SREQ includes change destination information indicating the memory control circuits 5 for changing allocation of bits of an address to be described later and allocation information indicating allocation of bits to be changed. For example, the request distribution circuit 4 outputs the memory access request MREQ to the memory control circuits 5 corresponding to the memories 3 to which an address AD included in the memory access request MREQ from the processor 1 is allocated. The request distribution circuit 4 outputs the setting change request SREQ to the memory control circuits 5 indicated by the change destination information included in the setting change request SREQ from the processor 1.

Each of the memory control circuits 5a and 5b includes an address translation control circuit 6 and an access control circuit 7. Upon receiving the setting change request SREQ from the request distribution circuit 4, the address translation control circuit 6 changes the allocation of bits of the address AD included in the memory access request MREQ based on the setting change request SREQ. Further, upon receiving the memory access request MREQ from the request distribution circuit 4, the address translation control circuit 6 replaces the bits of the address AD included in the memory access request MREQ according to the changed allocation and outputs the address AD with the bits replaced to the access control circuit 7.

The access control circuit 7 accesses the memory 3 corresponding to the own memory control circuit 5 based on the memory access request MREQ including the address AD with the bits replaced by the address translation control circuit 6 and performs the operation of read/write from/in the memory 3. For the purpose of brevity, the paths of data transferred between the processor 1 and the memory control circuitry 2 and between the memory control circuitry 2 and the memories 3 are not illustrated in FIG. 1.

FIG. 2 illustrates an example of access of a memory 3 by the memory control circuit 5 illustrated in FIG. 1. For example, the memory 3 has four banks BK (BK0 to BK3) for holding data. The memory 3 selects one of the banks BK0 to BK3 based on a 2-bit bank address BA among addresses AD received from the memory control circuitry 2 and writes data D in the selected bank BK or reads the data D from the selected bank BK.

For example, the address translation control circuit 6 illustrated in FIG. 1 allocates two bits of one of the addresses AD included in the memory access request MREQ to the bank address BA according to the allocation of the bits of the address changed based on the setting change request SREQ. When the bank address BA is allocated to a bit [1:0] of the address AD, the banks BK0, BK1, BK2, BK3, BK0, . . . are sequentially selected every time the address AD increases from "0" to "1", "2", and "3". Therefore, each time the address AD increases, the data D (D1 to D9) are read one by one from other banks BK or written one by one into other banks BK (see, e.g., section (A) of FIG. 2).

When the bank address BA is allocated to a bit [2:1] of the address AD, the banks BK0, BK0, BK1, BK1, BK2, BK2, BK3, BK3, BK0, BK0, . . . are sequentially selected every time the address AD increases from "0" to "1", "2", and "3". Therefore, every time the address AD increases, the data D (D1 to D9) are read two by two from other banks BK or written two by two into other banks BK (see, e.g., section (B) of FIG. 2). When the bank address BA is allocated to a bit [3:2] of the address AD, the banks BK0, BK0, BK0, BK0, BK1, BK1, BK1, BK1, BK2, BK2, . . . are sequentially selected every time the address AD increases from "0" to "1", "2", and "3". Therefore, every time the address AD increases, the data D (D1 to D9) are read four by four from other banks BK or written four by four into other banks BK (see, e.g., section (C) of FIG. 2).

It is to be noted that the bank address BA is allocated to the highest two bits of the address terminal of each of the memories 3a and 3b. Therefore, for example, when the processor 1 sequentially increases and outputs the address AD and the memory control circuit 5 outputs the address AD to each of the memories 3a and 3b without replacing the bits, a specific bank BK is intensively accessed.

The number of data D consecutively read from each bank BK based on plural addresses AD (increase or decrease) continuously generated by the access control circuit 7 for each memory access request MREQ is called data granularity. That is, the data granularity corresponds to the size of data input/output to each bank BK based on one memory access request MREQ. When the size of data handled by the data processing is changed, the processor 1 that executes a program outputs the setting change request SREQ to the memory control circuitry 2 and changes the data granularity by changing the allocation of bits of the address.

Section (A) of FIG. 2 illustrates the allocation of the bank address BA when accessing a memory 3 with the data granularity="1". Section (B) of FIG. 2 illustrates the allocation of the bank address BA when accessing the memory 3 with the data granularity of "2". Section (C) of FIG. 2 illustrates the allocation of the bank address BA when accessing the memory 3 with the data granularity of "4".

For example, by executing a so-called interleave operation in which other banks BK are sequentially accessed, an active operation of setting each bank BK to an accessible active state may be executed behind the access operation of the other banks BK. Therefore, as compared with a case where the same bank BK is consecutively accessed and an active operation is inserted during the access, the interleave operation may provide improved access efficiency.

In the meantime, the access to the memory 3 may be executed with the size handled by the data processing executed by the processor 1 as a unit in order to improve the efficiency of access to the memory 3. For example, when the data processing is executed with two data D1 and D2, D3 and D4, . . . as one unit, the interleave operation may be executed by accessing the memory 3 with the data granularity set to "2". When the data processing is executed with four data D1 to D4, D5 to D8, . . . as one unit, the interleave operation may be executed by accessing the memory 3 with the data granularity set to "4".

In contrast, for example, when the data processing is executed with four data D1 to D4, D5 to D8, . . . as one unit, in a case where the four data D1 to D4 are distributed to four banks BK0 to BK3, the four banks BK are set to an active state in each data processing. In this case, as compared with the operation illustrated in section (C) of FIG. 2, the frequency of execution of the active operation increases to hide the active operation, which may result in loss of the feature of the interleave operation for improving the access efficiency.

For example, when the data D1 to D4 written in the memory 3 with the data granularity set to "4" are read from the memory 3 with the data granularity set to "1", the data D1, D2, and D3 are read as the data D1, D5, and D 9. That is, the processor 1 reads erroneous data D. In order to suppress erroneous data processing from being executed due to the erroneous data D, the writing of data in the memory 3 and the reading of data from the memory 3 are performed by matching the data granularity.

Figure 3:
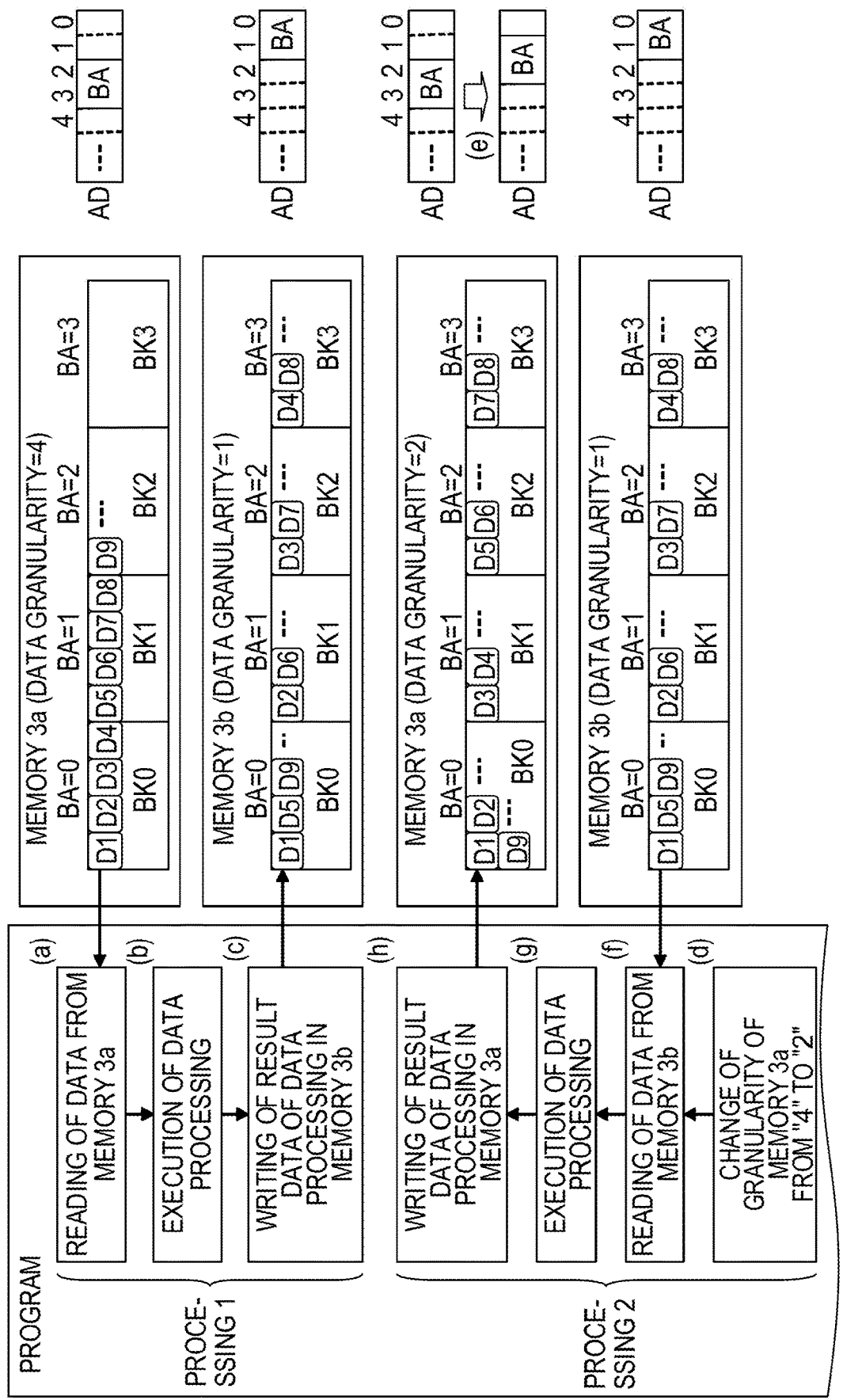
FIG. 3 is a view illustrating an example of the operation of the information processing apparatus illustrated in FIG. 1.

FIG. 3 illustrates an example of the operation of the information processing apparatus 100 illustrated in FIG. 1. That is, FIG. 3 illustrates an example of a control method of the information processing apparatus 100. In the example illustrated in FIG. 3, the information processing apparatus 100 executes data processing by causing the processor 1 to execute a program. The data used for the data processing are read from one of the memories 3a and 3b and the result data obtained by the data processing are written in one of the memories 3a and 3b.

In the example illustrated in FIG. 3, processing 1 and processing 2 are executed by a program executed by the processor 1. For example, when the information processing apparatus 100 executes the deep learning, each of the processing 1 and the processing 2 is a processing by a layer of a neural network. The granularity of the data handled in the data processing by the processing 1 is "4" and the granularity of the result data obtained by the data processing by the processing 1 is "1". In the meantime, the granularity of the data handled in the data processing by the processing 2 is "1" and the granularity of the result data obtained by the data processing by the processing 1 is "2"

The data granularity of the memory 3a in which the data used in the processing 1 are stored is previously set to "4" and the data to be used in the data processing is stored in the memory 3a. Before starting the processing 1, the data granularity of the memory 3b storing the result data of the data processing is set to "1". The data granularities of the memories 3a and 3b are set by the processor 1 executing the program in which the setting change instruction including the setting information of the data granularity is described and outputting the setting change request SREQ to the memory control circuitry 2.

First, the processor 1 reads data from the memory 3a with granularity of "4" (see, e.g., section (a) of FIG. 3). Next, the processor 1 executes the data processing by the processing 1 in the order of reading data from the memory 3a (see, e.g., section (b) of FIG. 3). Next, the processor 1 writes the result data obtained by the data processing in the memory 3b with granularity of "1" in the order obtained (see, e.g., section (c) of FIG. 3).

The granularity of data used in the data processing differs from the granularity of the result data of the data processing. The data granularity may be independently set in each of the plural memories 3a and 3b, thereby using the memories 3a and 3b properly for each data granularity to optimize the efficiency of access to each of the memories 3a and 3b. Furthermore, it is possible to read data from the memory 3a in the order in which the data processing may be easily executed without executing processing such as changing the arrangement order of the data by a program, and write data in the memory 3b in the order in which the next data processing (e.g., the processing 2) may be easily executed.

The result data of the processing 1 written in the memory 3b are used in the processing 2. In addition, the granularity of the result data obtained by the data processing of the processing 2 is "2". Therefore, in the processing 2, the processor 1 changes the data granularity of the memory 3a from "4" to "2" (see, e.g., sections (d) and (e) of FIG. 3). The data granularity of the memory 3b is not changed.

Next, the processor 1 reads data from the memory 3b with granularity of "1" (see, e.g., section (f) of FIG. 3). Next, the processor 1 executes data processing by the processing 2 in the order of reading data from the memory 3b (see, e.g., section (g) of FIG. 3). Next, the processor 1 writes the result data obtained by the data processing in the memory 3a with granularity of "2" in the order obtained (see, e.g., section (h) of FIG. 3).

In the meantime, when the memory control circuitry 2 does not have the address translation control circuit 6, the address AD output from the processor 1 is supplied to the memory 3a or 3b via the access control circuit 7 without exchanging bits thereof. In this case, as described with reference to FIG. 2, since the memory 3a or 3b is accessed by the sequentially increasing address AD, a specific bank BK is intensively accessed.

Therefore, the data read from each of the memories 3a or 3b are rearranged by a program for use in each data processing, and the result data obtained by the data processing are rearranged by the program before being written in each of the memories 3a and 3b. Alternatively, the data to be processed which are distributed and held in the banks BK0 to BK3 are read by individually accessing the banks BK0 to BK3 by a program. The result data are distributed and written in the banks BK0 to BK3 by individually accessing the banks BK0 to BK3 by a program. As a result, the efficiency of access to the memories 3a and 3b decreases as compared with the case of using the address translation control circuit 6.

In other words, when using the address translation control circuit 6, it is possible to execute data processing without rearranging the data read from each of the memories 3a and 3b and to write the result data of the data processing in each of the memories 3a and 3b without rearranging the result data. That is, it is possible to read the data to be processed from each of the memories 3a and 3b without writing an instruction group for executing the processing of rearranging the data in a program and to write the result data in each of the memories 3a and 3b. As a result, the processing 1 and the processing 2 may be executed with the access efficiency optimized, and the processing performance of the information processing apparatus 100 may be improved compared with the case where the bits of the address AD are not exchanged.

As described above, in the embodiment illustrated in FIGS. 1 to 3, in accordance with the processing of the program executed by the processor 1, the granularity of the data to be input/output to/from the memories 3a and 3b may be changed dynamically for each of the memories 3a and 3b. As a result, as compared with the case where the data granularity is not changed, the efficiency of access to the memories 3a and 3b may be improved and the processing performance of the information processing device 100 may be also improved.

Figure 4:
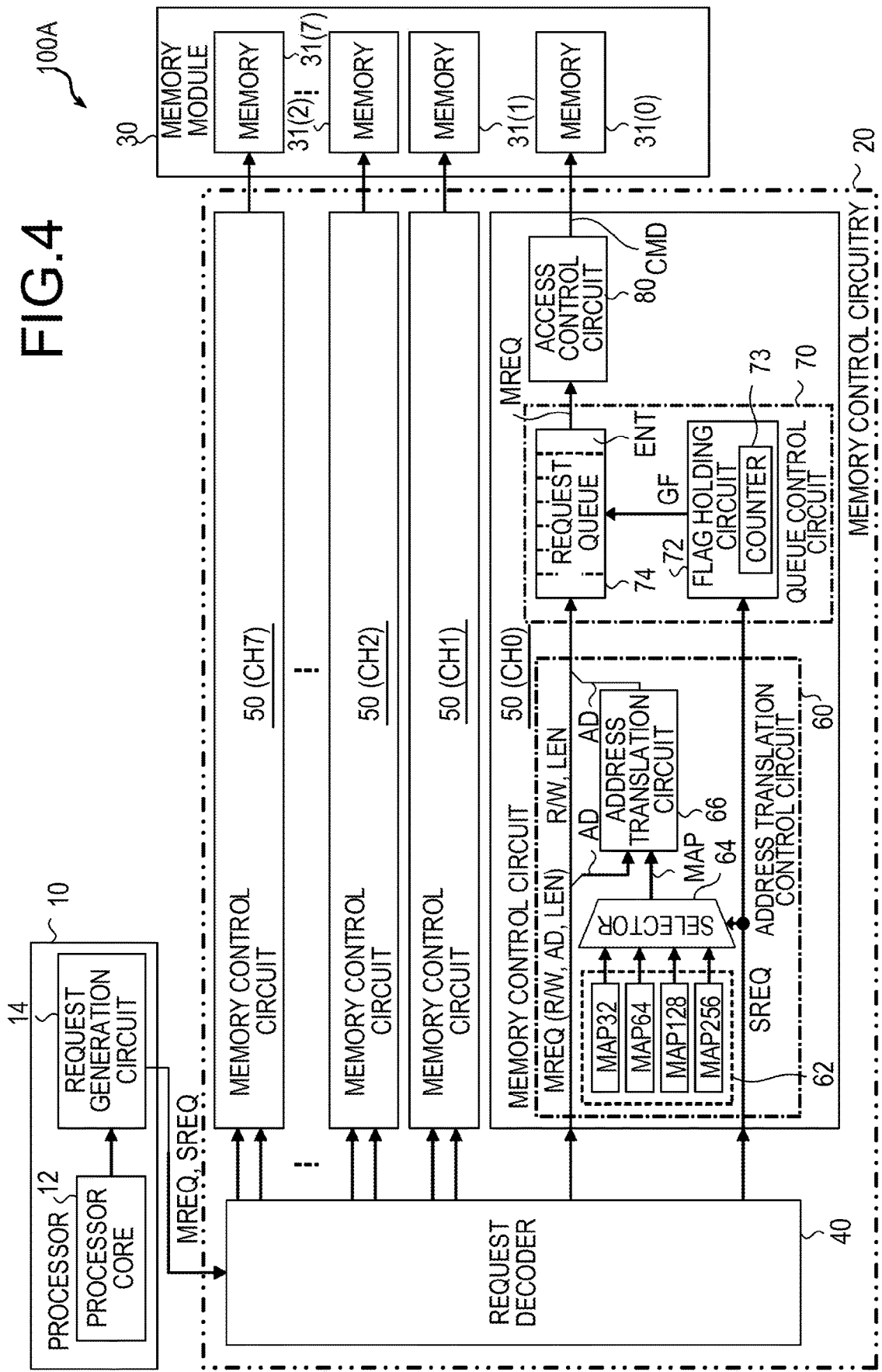
FIG. 4 is a view illustrating an information processing apparatus, a memory control circuitry, and a control method of the information processing apparatus according to another embodiment.

FIG. 4 illustrates an information processing apparatus, a memory controller, and a control method of the information processing apparatus according to another embodiment. The same or similar elements as those in FIG. 1 are denoted by the same reference numerals and detailed explanation thereof will not be repeated.

The information processing apparatus 100A illustrated in FIG. 4 is, for example, a server and includes a processor 10, a memory controller 20, and a memory module 30 including eight memories 31 (31(0) to 31(7)) to which different addresses are allocated. The number of memories 31 included in the memory module 30 is not limited to eight. The processor 10 is, for example, an artificial intelligence (AI) processor that executes the deep learning processing, and includes a processor core 12 and a request generation circuit 14. The processor 10 includes, for example, a cache memory (not illustrated), and a communication interface (not illustrated). Further, the processor 10 may have plural processor cores 12.

The processor 10 is an example of a processor that executes arithmetic processing, the memory controller 20 is an example of a memory control circuitry, and the memories 31 are an example of a memory. For the purpose of brevity, the paths of data transferred between the processor 10 and the memory controller 20 and between the memory controller 20 and the memory module 30 are not illustrated in the figure.

The processor core 12 includes an instruction decoder (not illustrated), various arithmetic units such as, for example, a floating-point product-sum arithmetic unit and plural registers. The processor core 12 executes an arithmetic processing by executing an arithmetic instruction described in a program stored in the memory module 30. When an instruction described in the program indicates an access to the memory module 30 or a change in the setting of the memory controller 20, the processor core 12 outputs information of an operation code (OP code) and an operand included in the instruction to the request generation circuit 14.

Hereinafter, an instruction indicating an access to the memory module 30 is referred to as a memory access instruction, and an instruction indicating a change in setting of the memory controller 20 is referred to as a setting change instruction. For example, the setting change instruction is an instruction to cause the memory controller 20 to change allocation of the bits of the address AD included in the memory access request MREQ. When receiving the information indicating the memory access instruction from the processor core 12, the request generation circuit 14 generates the memory access request MREQ and outputs it to the memory controller 20. The memory access request MREQ is issued when performing read access or write access to each memory 31 of the memory module 30. Further, when receiving the information indicating the setting change instruction from the processor core 12, the request generation circuit 14 generates the setting change request SREQ and outputs it to the memory controller 20.

The memory controller 20 includes a request decoder 40 and eight memory control circuits 50 corresponding respectively to the memories 31(0) to 31(7).

When decoding the memory access request MREQ, the request decoder 40 outputs a read/write type R/W, an address AD (physical address), and data length LEN of data to be accessed to one of the memory control circuits 50 as the memory access request MREQ. The request decoder 40 outputs the memory access request MREQ to the memory control circuit 50 corresponding to the memory 31 to which the address AD included in the memory access request MREQ is allocated. The read/write type R/W is a read command RD or a write command WR described with reference to FIG. 6. By providing the request decoder 40 in the memory controller 20, even when the memory controller 20 has the plural memory control circuits 50, it is possible to output the memory access request MREQ to the memory control circuit 50 corresponding to the memory 31 to be accessed.

Figure 6:
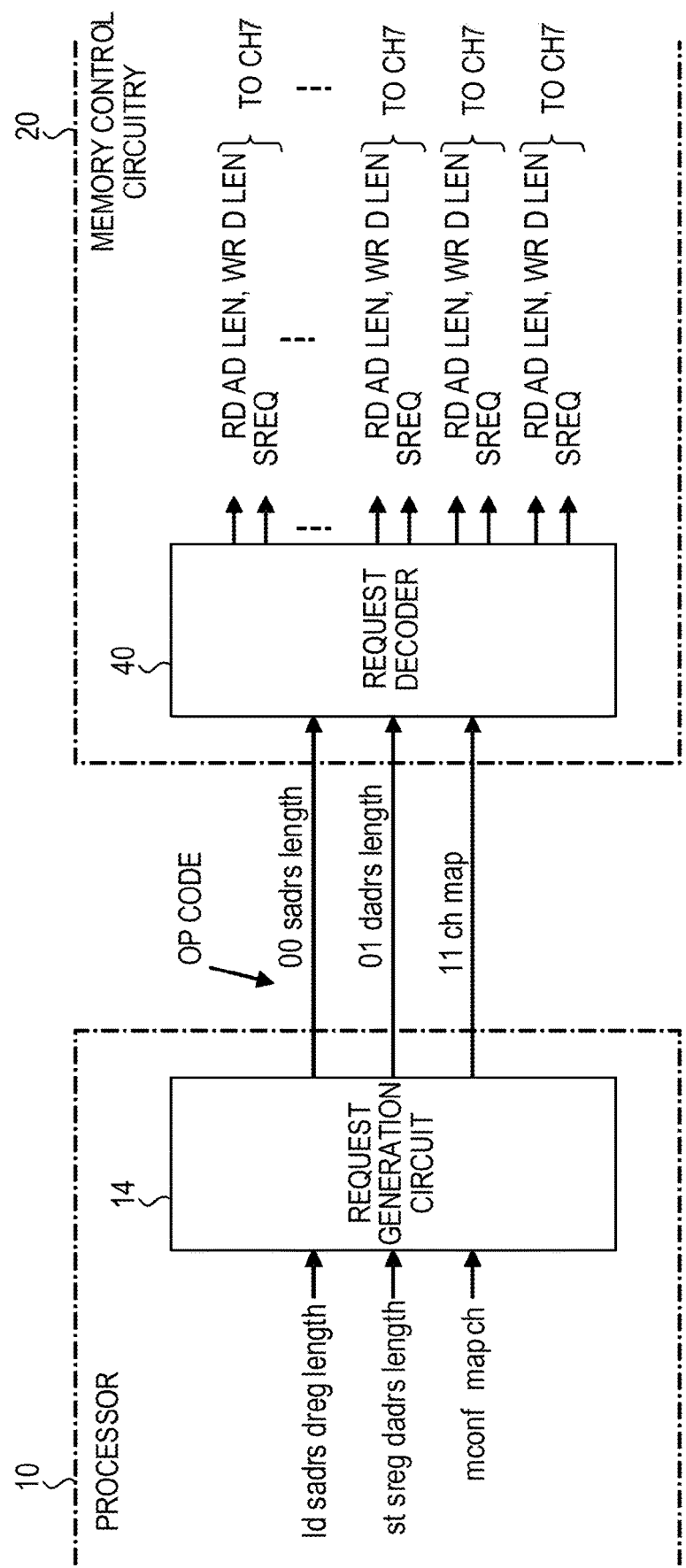
FIG. 6 is a view illustrating an example of the operation of a request generation circuit and a request decoder illustrated in FIG. 4.

When decoding the setting change request SREQ for changing the setting of the memory controller 20, the request decoder 40 outputs the setting change request SREQ to one of the memory control circuits 50. The request decoder 40 outputs the setting change request SREQ to the memory control circuit 50 indicated by the change destination information included in the setting change request SREQ. By providing the request decoder 40 in the memory controller 20, even when the memory controller 20 has the plural memory control circuits 50, it is possible to output the setting change request SREQ to the memory control circuit 50 of a change object of map information MAP to be described later. An example of the operation of the request generation circuit 14 and the request decoder 40 is illustrated in FIG. 6. The request decoder 40 is an example of a request distribution circuit.

Since the memory control circuits 50 have the same circuit configuration, the configuration of a memory controller 50 connected to the memory 31(0) will be described below. In the following description, the memory control circuits 50 connected respectively to the memories 31(0) to 31(7) are also called channels CH0 to CH7, respectively. The number of a channel CH connected to each memory 31 is equal to the numerical value in the parentheses of the memory 31. Although not particularly limited, a data line connecting each memory control circuit 50 and each memory 31 is, for example, 128 bits (16 bytes).

The memory control circuit 50 includes an address translation control circuit 60, a queue control circuit 70, and an access control circuit 80. The address translation control circuit 60 includes a map information holding circuit 62, a selector 64, and an address translation circuit 66. The map information holding circuit 62 holds plural pieces of map information MAP (MAP32, MAP64, MAP128 and MAP256) indicating the granularity of data of memory access to the memory module 30 and outputs the held map information MAP to the selector 64. The map information MAP32 corresponds to the data granularity of "32B (bytes)" and the map information MAP64 corresponds to the data granularity of "64B". The map information MAP128 corresponds to the data granularity of "128B" and the map information MAP256 corresponds to the data granularity of "256B".

The selector 64 selects one of the plural pieces of map information MAP based on the information indicating the data granularity included in the setting change request SREQ from the request decoder 40 and outputs the selected map information MAP to the address translation circuit 66. The selector 64 has a function of holding the selected map information MAP and continues to output the selected map information MAP to the address translation circuit 66. The map information holding circuit 62 is an example of an information holding circuit, the selector 64 is an example of a selection circuit, and the map information MAP is an example of allocation information indicating allocation of bits of an address included in the memory access request MREQ.

Figure 9:
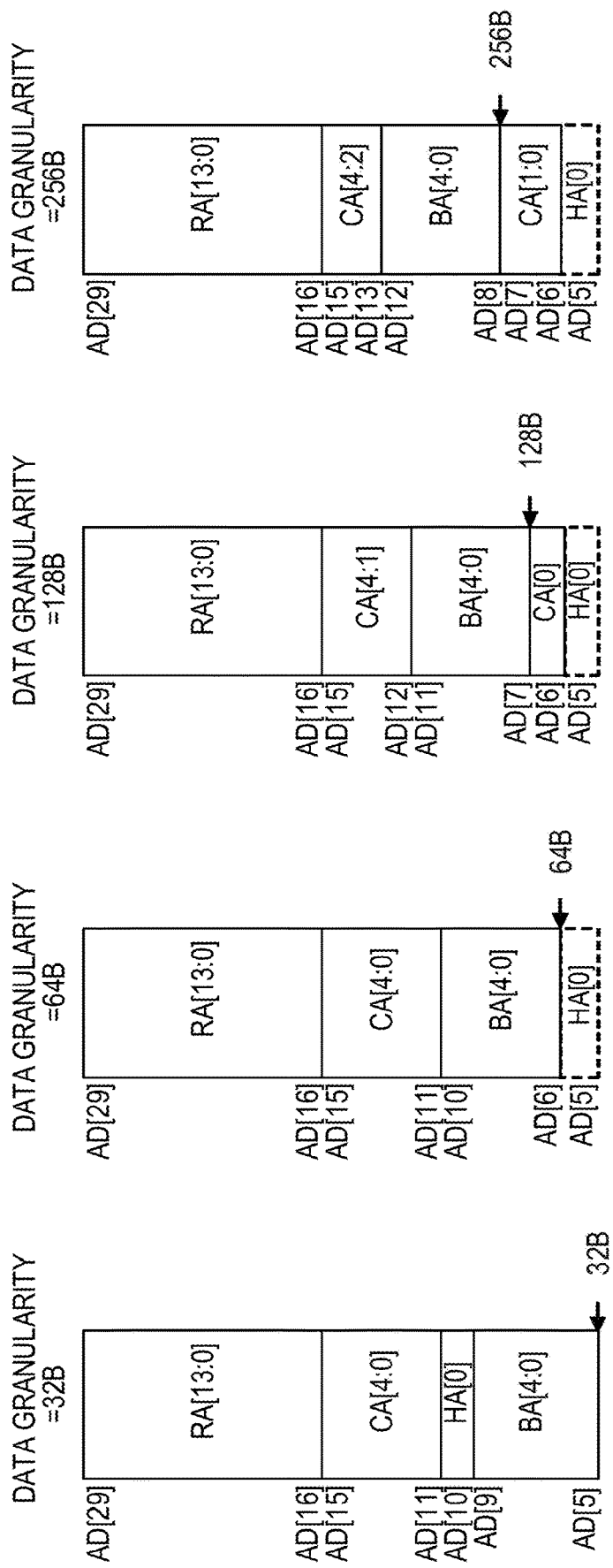
FIG. 9 is a view illustrating an example of allocation of bits of an address for each granularity of data input/output to each memory illustrated in FIG. 8.

The address translation circuit 66 changes the allocation of the bits of the address AD included in the memory access request MREQ based on the map information MAP from the selector 64. When receiving the address AD included in the memory access request MREQ, the address translation circuit 66 replaces the bits of the address AD based on the changed bit allocation and outputs the address AD whose bits are replaced to the queue control circuit 70. An example of changing the allocation of the bits of the address AD by the address translation circuit 66 is illustrated in FIG. 9.

By selecting one of the plural pieces of map information MAP held in advance in the map information holding circuit 62 based on the setting change request SREQ, the allocation of the bits of the address AD may be easily changed as compared with a case of generating the map information MAP based on the setting change request SREQ. Further, it is possible to output the map information MAP to the address translation circuit 66 earlier than the case of generating the map information MAP based on the setting change request SREQ.

The queue control circuit 70 includes a flag holding circuit 72 and a request queue 74. The flag holding circuit 72 includes a counter 73 for updating a counter value each time it receives the setting change request SREQ from the request decoder 40. The flag holding circuit 72 outputs the counter value of the counter 73 as a group flag GF to the request queue 74. The value of the group flag GF is an example of a flag value.

Figure 5:
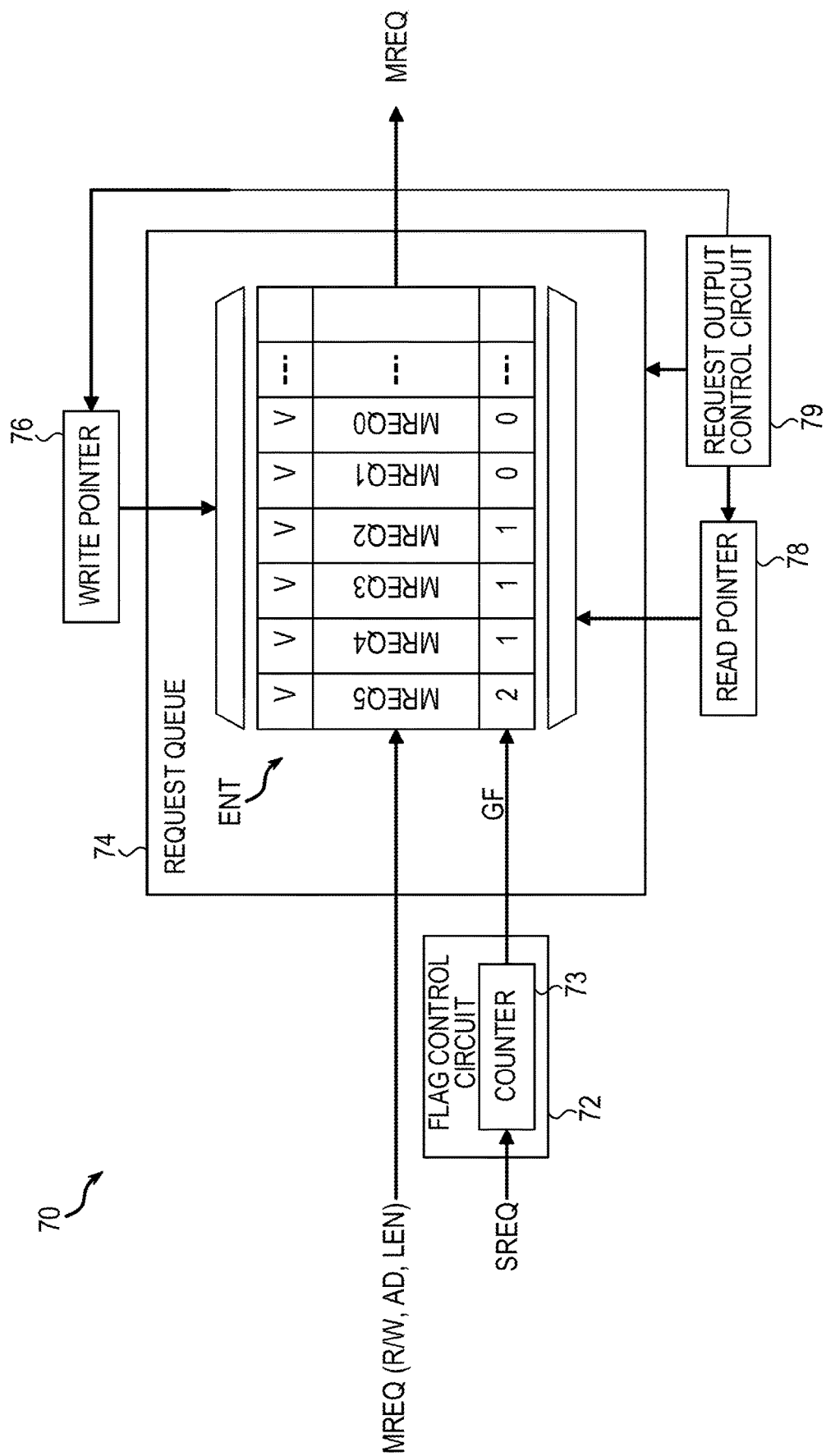
FIG. 5 is a view illustrating of a queue control circuit illustrated in FIG. 4.

The request queue 74 has plural entries ENT for holding the memory access request MREQ together with the value of the group flag GF from the flag holding circuit 72. In the memory access requests MREQ, the read/write type R/W and the data length LEN are supplied from the request decoder 40 and the address AD is supplied from the address translation circuit 66. The request queue 74 selects one of the memory access requests held in the entry ENT based on a request from the access control circuit 80 and outputs the selected memory access request MREQ to the access control circuit 80. An example of the queue control circuit 70 is illustrated in FIG. 5. The request queue 74 is an example of a request holding circuit.

Based on the memory access request MREQ from the queue control circuit 70, the access control circuit 80 generates an access command CMD for accessing the memory 31(0) and outputs the generated access command CMD to the memory 31(0). The access command CMD includes, for example, a read command, a write command, and an active command for setting the memory 31(0) to an accessible active state.

Each of the memories 31(0) to 31(7) included in the memory module 30 includes, for example, a predetermined number of synchronous dynamic random access memory (SDRAMs), and operates independently based on the access command CMD from the corresponding channel CH.

FIG. 5 illustrates an example of the queue control circuit 70 illustrated in FIG. 4. The queue control circuit 70 includes a write pointer 76, a read pointer 78 and a request output control circuit 79 in addition to the flag holding circuit 72 and the request queue 74 illustrated in FIG. 4. Each entry ENT of the request queue 74 includes an area for storing the memory access request MREQ, a valid flag V set when a valid memory access request MREQ is stored in the entry ENT, and an area for storing the group flag GF.

The write pointer 76 outputs pointer information indicating an entry ENT storing the memory access request MREQ to the request queue 74. The read pointer 78 outputs pointer information indicating an entry ENT from which the memory access request MREQ is taken out to the request queue 74. For example, the write pointer 76 indicates an entry ENT storing the newest memory access request MREQ, and the read pointer 78 indicates an entry ENT storing the oldest memory access request MREQ.

Based on the value of the group flag GF held by each of the plural entries ENT of the request queue 74, the request output control circuit 79 controls replacement of the order of output of plural memory access requests MREQ held respectively by the plural entries ENT to the access control circuit 80. That is, the request output control circuit 79 permits the replacement of the order of output of plural memory access requests MREQ held respectively by the plural entries ENT holding group flags GF having the same value to the access control circuit 80. Further, the request output control circuit 79 prohibits replacement of the order of output of the plural memory access requests MREQ held respectively by the plural entries ENT holding group flags GF having different values to the access control circuit 80.

For example, in FIG. 5, the memory access requests MREQ0 and MREQ1 with the group flag GF of "0" may be replaced in the order of output to the access control circuit 80. The memory access requests MREQ2 to MREQ4 with the group flag GF of "1" may be also replaced in the order of output to the access control circuit 80. In the meantime, replacement of the order of output between the memory access requests MREQ0 and MREQ1 having different values of the group flag GF and the memory access requests MREQ2 to MREQ4 is prohibited.

For example, the flag holding circuit 72 increases the value of the group flag GF by "1" each time the address translation circuit 66 changes the allocation of the bits of the address AD based on the setting change request SREQ from the request decoder 40. For this reason, in the example illustrated in FIG. 5, the request queue 74 holding three kinds of group flags GF holds six memory access requests MREQ with the address AD translated by one of the three pieces of map information MAPs.

The state of the request queue 74 illustrated in FIG. 5 indicates that two memory access instructions are executed after the first setting change instruction is executed and that the memory access requests MREQ0 and MREQ1 are stored in the entry ENT (GF="0"). In addition, this state indicates that three memory access instructions are executed after the next setting change instruction is executed and that the memory access requests MREQ2, MREQ3 and MREQ4 are stored in the entry ENT (GF="1"). Further, this state indicates that one memory access instruction is executed after the next setting change instruction is executed and that the memory access request MREQ5 is stored in the entry ENT (GF="2").

In other words, the memory access requests MREQ0 and MREQ1, the memory access requests MREQ2, MREQ3, and MREQ4, and the memory access request MREQ5 have different map information MAP with a translated address AD from each other. For example, the memory access requests MREQ0 and MREQ1 include an address AD whose bit position has been translated by the map information MAP256, and the memories 31 are accessed with the data granularity of "256B".

Figure 13:
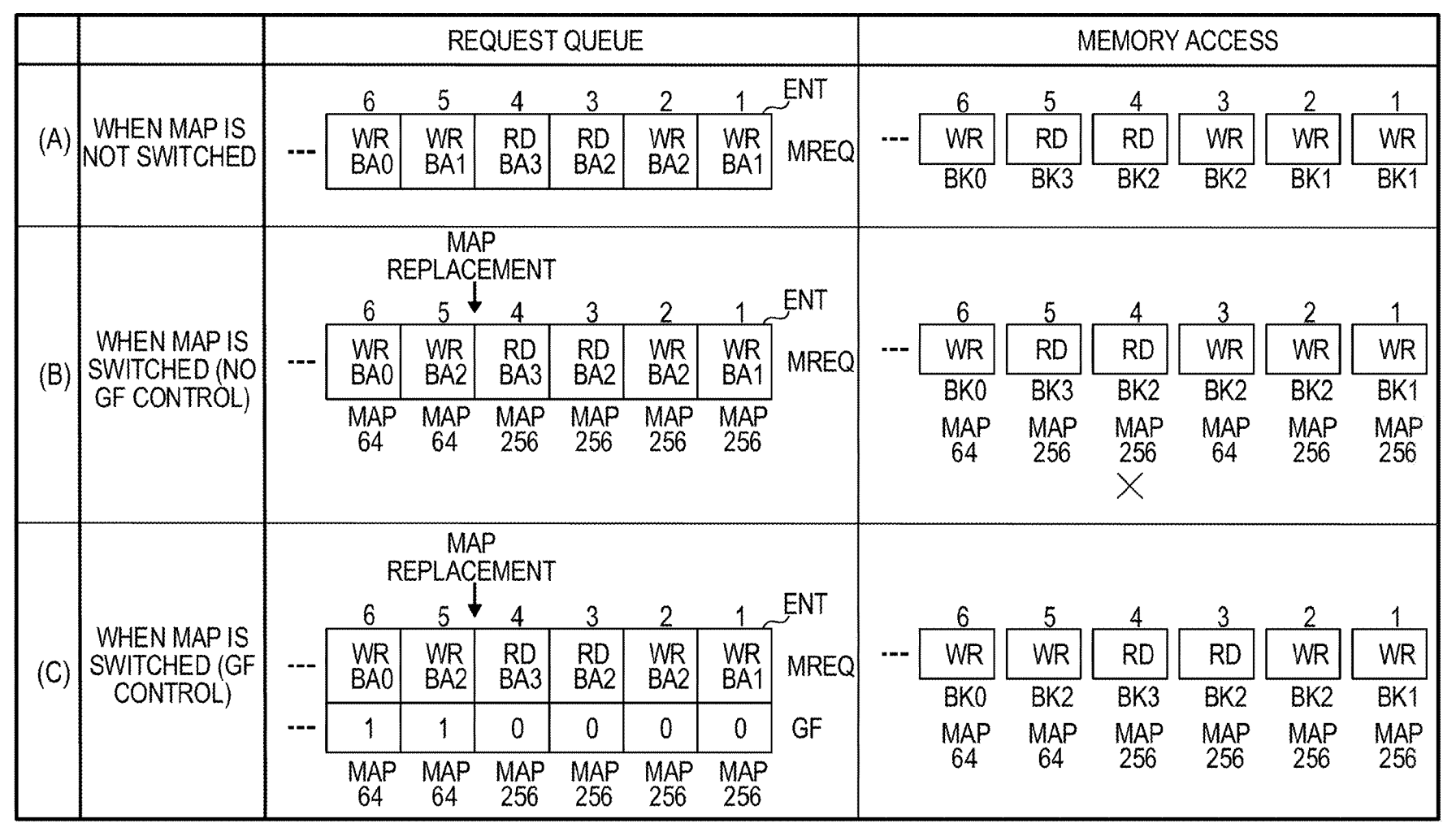

The memory access requests MREQ2, MREQ3, and MREQ4 include an address AD whose bit position has been translated by the map information MAP64, and the memories 31 are accessed with the data granularity of "64B". The memory access request MREQ5 includes an address AD whose bit position has been translated by the map information MAP128, and the memories 31 are accessed with the data granularity of "128B". The outline of the control of the request queue 74 by the flag holding circuit 72 is illustrated in FIG. 13.

FIG. 6 illustrates an example of the operation of the request generation circuit 14 and the request decoder 40 illustrated in FIG. 4. The request generation circuit 14 operates based on information indicating a memory access instruction (load instruction or store instruction) or information indicating a setting change instruction for changing the allocation of the bits of the address AD by the address translation control circuit 60, which is received from the processor core 12 (see, e.g., FIG. 4).

In FIG. 6, the information received from the processor core 12 by the request generation circuit 14 is indicated by a load instruction, a store instruction, and a setting change instruction. The load instruction includes an instruction code for identifying the load instruction (ld), a head address of a memory area from which data are read (sadrs), a register number for storing the read data (dreg), and a size of the read data (length). The store instruction includes an instruction code for identifying the store instruction (st), a head register number source in which data to be written are stored (sreg), a head address of a memory area in which data are written (dadrs), and a size of data to be written (length). The setting change instruction includes an instruction code for identifying the setting change instruction (mconf), allocation information indicating allocation of bits of an address AD (map), and channel information indicating a channel CH for changing allocation of the bits of the address AD (ch). For example, the request generation circuit 14 generates a packet for outputting each instruction to the request decoder 40. In the store instruction, the write data are stored in a payload area of the packet.

When receiving the code of the load instruction (ld), the request generation circuit 14 outputs an OP code "00" indicating the load instruction, the head address (sadrs), and the data size (length) to the request decoder 40. When receiving the code of the store instruction (st), the request generation circuit 14 outputs an OP code "01" indicating the store instruction, the head address (dadrs), and the data size (length) to the request decoder 40. When receiving the code of the setting change command (mconf), the request generation circuit 14 outputs an OP code "11" indicating the setting change instruction, the channel information (ch), and the allocation information (map) to the request decoder 40. The setting change command may include a register number indicating a register holding the allocation information (map) and the channel information ch, instead of the allocation information map and the channel information ch.

The request decoder 40 detects a request issued by the processor 10 by decoding the OP code received from the request generation circuit 14. When detecting the load instruction, the request decoder 40 outputs the read command RD, the address AD, and the data length LEN to a channel CH corresponding to a memory 31 to which the head address (sadrs) is allocated. The address AD is the head address (sadrs) received from the request generation circuit 14 and the data length LEN is the data size (length) received from the request generation circuit 14.

When detecting the store instruction, the request decoder 40 outputs the write command WR, the address AD, and the data length LEN to a channel CH corresponding to a memory 31 to which the head address (dadrs) is allocated. The address AD is the head address (dadrs) received from the request generation circuit 14 and the data length LEN is the data size length received from the request generation circuit 14.

When detecting the setting change command, the request decoder 40 outputs the setting change request SREQ including the allocation information map received from the request generation circuit 14 to the channel CH indicated by the channel information (ch). Then, the channel CH that has received the allocation information (map) changes the allocation of the bits of the address AD, thereby changing the granularity of data input/output to/from the memories 31. In the following description, the load instruction is also referred to as a load instruction (ld), the store instruction is also referred to as a store instruction (st), and the setting change instruction is also referred to as a setting change instruction (mconf).

Figure 7:
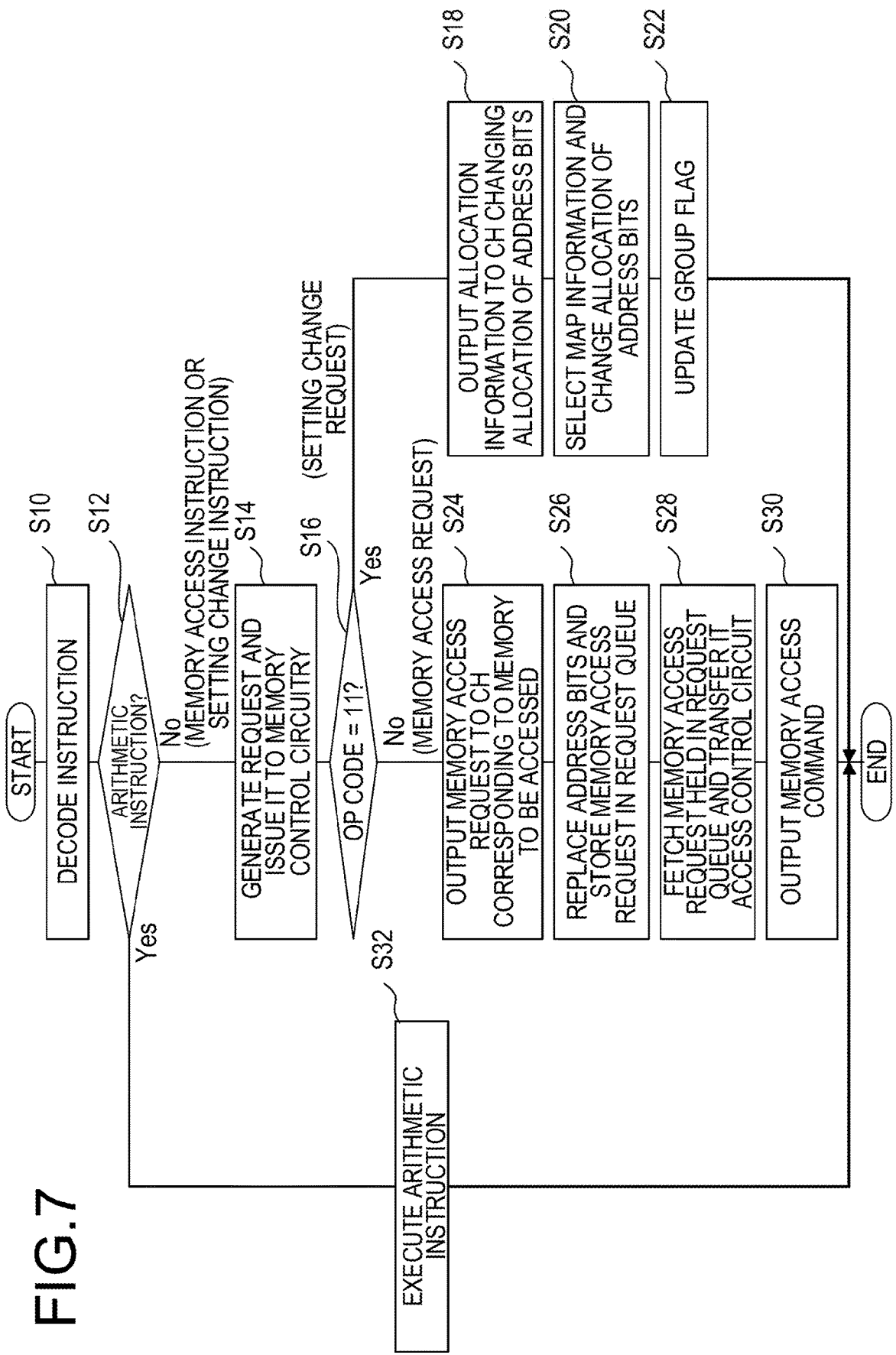
FIG. 7 is a view illustrating an example of the operation of the information processing apparatus illustrated in FIG. 4.

FIG. 7 illustrates an example of the operation of the information processing apparatus 100A illustrated in FIG. 4. That is, FIG. 7 illustrates an example of a control method of the information processing apparatus 100A. The operation illustrated in FIG. 7 is started in response to an instruction fetched by the processor core 12.

First, in step S10, the processor core 12 decodes the fetched instruction. Next, in step S12, when the decoded instruction is an arithmetic instruction, the operation of the processor core 12 proceeds to step S32. When the decoded instruction is not an arithmetic instruction (i.e., when the decoded instruction is a memory access instruction or a setting change instruction), the operation proceeds to step S14.

In step S14, the request generation circuit 14 generates a request including an OP code based on the information from the processor core 12, and outputs the generated request to the memory controller 20. Next, in step S16, the request decoder 40 decodes the OP code included in the request received from the request generation circuit 14. When the OP code is "11", the operation of the request decoder 40 proceeds to step S18. When the OP code is other than "11", that is, when the OP code is a memory access request, the operation proceeds to step S24.

In step S18, the request decoder 40 outputs the allocation information map included in the setting change request SREQ to a channel CH indicated by change destination information included in the setting change request SREQ received from the request generation circuit 14. Here, the channel CH indicated by the change destination information is a channel CH for changing the allocation of the bit of the address AD.

Next, in step S20, the address translation control circuit 60 of the channel CH that has received the setting change request SREQ from the request decoder 40 selects the map information MAP indicated by the allocation information map. Then, in accordance with the selected map information MAP, the address translation control circuit 60 causes the address translation circuit 66 to change the bit allocation in order to replace the bits of the address AD. That is, the address translation circuit 66 is caused to change the granularity of data to be input/output to/from the memories 31. Next, in step S22, the queue control circuit 70 of the channel CH that has received the setting change request SREQ from the request decoder 40 updates the counter value (group flag GF) of the counter 73 (see, e.g., FIG. 5) based on the received setting change request SREQ, and then the operation is ended.

In the meantime, when decoding the memory access request, in step S24, the request decoder 40 outputs the memory access request MREQ to a channel CH corresponding to a memory 31 to be accessed. Next, in step S26, the address translation circuit 66 of the channel CH which has received the memory access request MREQ replaces the bits of the address AD included in the memory access request MREQ in accordance with the map information MAP. Then, the address translation circuit 66 stores the address AD with the bits replaced in the request queue 74 together with the read/write type R/W and the data length LEN.

In step S28, based on a request from the access control circuit 80, the queue control circuit 70 fetches one of the memory access requests MREQ held in the request queue 74 and outputs the fetched memory access request MREQ to the access control circuit 80. Regardless of the fetch timing of an instruction executed by the processor core 12, the operation of step S28 is executed when the memory 31 is accessible, for example, when the memory access request MREQ is held in the request queue 74.

Next, in step S30, the access control circuit 80 generates an access command CMD based on the memory access request MREQ transferred from the queue control circuit 70 and outputs the generated access command CMD to the memory 31. Then, a read operation or a write operation for the memory 31 is executed, and then the operation is ended. In the meantime, in step S32, the processor core 12 executes an arithmetic instruction, and then the operation is ended.

Figure 8:
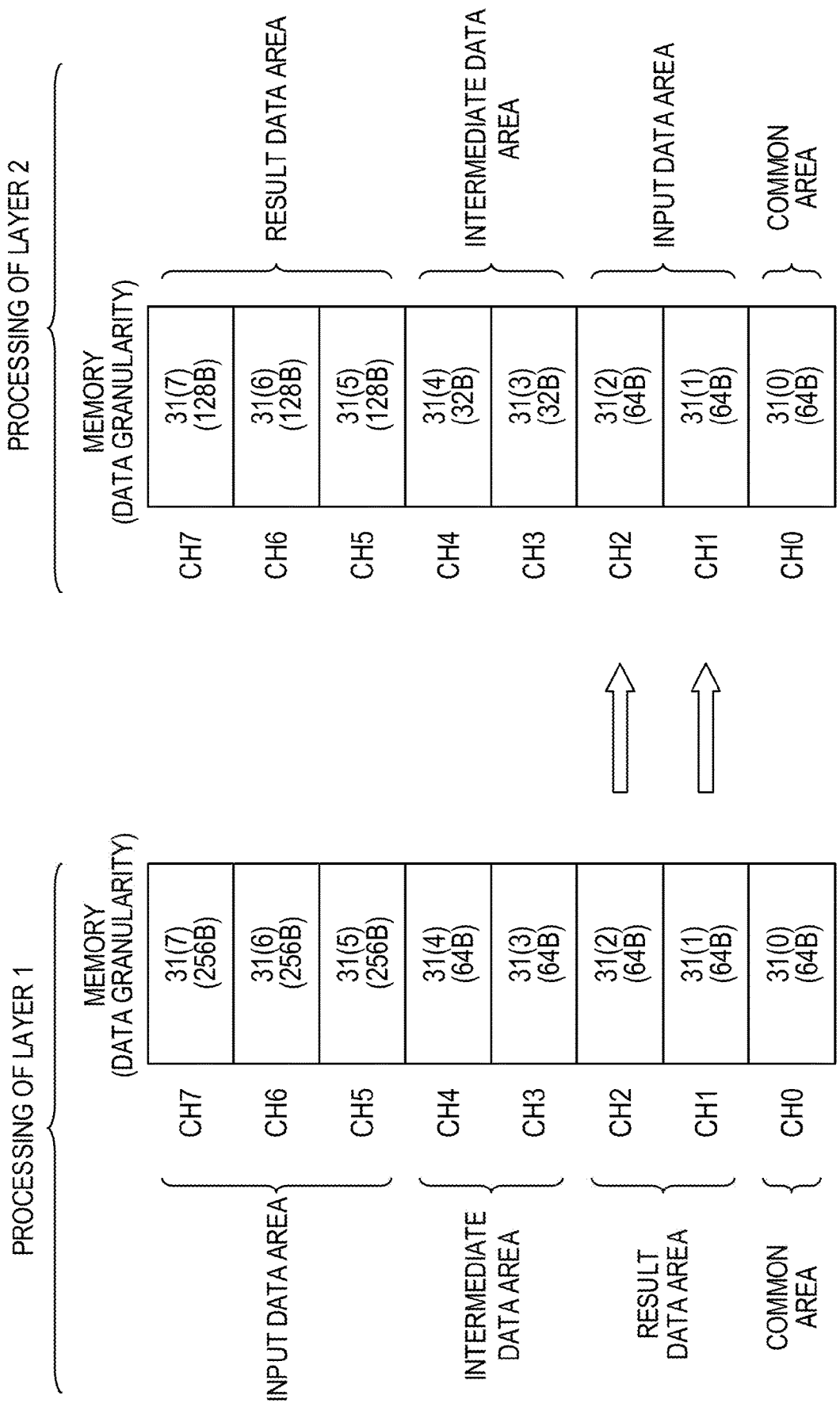
FIG. 8 is a view illustrating an example of a process executed by the information processing apparatus illustrated in FIG. 4.

FIG. 8 illustrates an example of processing executed by the information processing apparatus 100A illustrated in FIG. 4. By causing the processor 10 to execute a program, the information processing apparatus 100A sequentially executes, for example, processing of layer 1 and processing of layer 2 in a neural network.

In the processing of layer 1, a common area that holds, for example, programs and work data is allocated to the memory 31(0) corresponding to the channel CH0. A result data area that holds the result data of the processing of layer 1 is allocated to the memories 31(1) and 31(2) corresponding respectively to the channels CH1 and CH2. An intermediate data area that holds intermediate data obtained during the processing of layer 1 is allocated to the memories 31(3) and 31(4) corresponding respectively to the channels CH3 and CH4. An input data area that holds input data used in the processing of layer 1 is allocated to the memories 31(5) to 31(7) corresponding respectively to the channels CH5 to CH7.

The granularity of data input/output to/from each of the memories 31(0) to 31(7) is set to the optimum granularity according to the data characteristics. That is, the granularity of data input/output to/from the memories 31(0) to 31(4) is set to 64B and the granularity of data input/output to/from the memories 31(5) to 31(7) is set to 256B. In the processing of layer 1, data held in any of the memories 31(5) to 31(7) are used to execute data processing, and intermediate data obtained by the data processing are stored in the memories 31(3) and 31(4). Further, the intermediate data stored in the memories 31(3) and 31(4) are used to execute the next data processing, and the result data obtained by the data processing are stored in the memories 31(1) and 31(2).

In the processing of layer 2, a common area that holds, for example, programs and work data is allocated to the memory 31(0) corresponding to the channel CH0. An input data area that holds input data used in the processing of layer 2 is allocated to the memories 31(1) and 31(2) corresponding respectively to the channels CH1 and CH2. In the processing of layer 2, the result data obtained by the processing of layer 1 are used as the input data.

In the processing of layer 2, an intermediate data area that holds intermediate data obtained during the processing of layer 2 is allocated to the memories 31(3) and 31(4) corresponding respectively to the channels CH3 and CH4. A result data area that holds the result data obtained by the processing of layer 3 is allocated to the memories 31(5) to 31(7) corresponding respectively to the channels CH5 to CH7.

In the processing of layer 2, the result data in the processing of layer 1 processing held in the memory 31(1) and 31(2) are used to execute data processing, and the intermediate data obtained by the data processing are stored in the memories 31(3) and 31(4). Further, the intermediate data stored in the memories 31(3) and 31(4) are used to execute the next data processing, and the result data obtained by the data processing are stored in the memories 31(5) to 31(7).

In the processing of layer 2, the granularity of data input/output to/from each of the memories 31(0) to 31(7) is set to the optimum granularity according to the data characteristics. That is, the granularity of data input/output to/from the memories 31(0) and 31(2) is set to 64B, the granularity of data input/output to/from the memories 31(3) and 31(4) is set to 32B, and the granularity of data input/output to/from the memories 31(5) to 31(7) is set to 128B. In the processing of layer 2, data held in the memories 31(1) and 31(2) are used to execute data processing, and intermediate data obtained by the data processing are stored in the memories 31(3) and 31(4). Further, the intermediate data stored in the memories 31(3) and 31(4) are used to execute data processing, and the result data obtained by the data processing are stored in the memories 31(5) to 31(7).

FIG. 9 illustrates an example of allocation of the bits of the address AD for each granularity of data input/output to/from each memory 31 illustrated in FIG. 8. For example, the memory access request MREQ includes a 25-bit address AD [29:5]. Of the address AD, 14 bits are used for a row address RA [13:0], 5 bits are used for a column address CA [4:0], 5 bits are used for a bank address BA [4:0], and one bit is used for a half address HA [0]. The row address RA, the column address CA, and the half address HA are examples of internal addresses.

In each memory 31, one of the 32 banks is selected according to the bank address BA, and one of 16384 row areas (memory areas) in the selected bank is selected according to the row address RA. Further, one of 32 column areas (memory areas) in the selected row area is selected according to the column address CA. The bank, the row area, and the column area will be described with reference to FIG. 10.

In the read operation, the data held in the column area selected by the column address CA are read from the memories 31. In the write operation, the data are written in the column area selected by the column address CA. When the data granularity is 32B, the data of the upper half or lower half of the data corresponding to the column area selected by the column address CA are selected by the half address HA.

The address AD [29:16] is allocated to the row address RA [13:0] irrespective of the data granularity. When the data granularity is 64B, 128B, or 256B, the address AD [5] is allocated to the half address HA [0], but the half address HA [0] is not used for access to the memories 31.

When the data granularity is 32B, the address AD [15:11] is allocated to the column address CA [4:0], the address AD [10] is allocated to the half address HA [0], and the address AD [9:5] is allocated to the bank address BA [4:0]. Then, for each memory access request MREQ, data of 32B are input/output to/from the memories 31.

When the data granularity is 64B, the address AD [15:11] is allocated to the column address CA [4:0], and the address AD [10:6] is allocated to the bank address BA [4:0]. Then, for each memory access request MREQ, data of 64B are input/output to/from the memories 31.

When the data granularity is 128B, the addresses AD [15:12] and AD [6] are allocated to the column addresses CA [4:1] and CA [0], respectively, and the address AD [11:7] is allocated to the bank address BA [4:0]. Then, for each memory access request MREQ, data of 128B are input/output to/from the memories 31.

When the data granularity is 256B, the addresses AD [15:13] and AD [7:6] are allocated to the column addresses CA [4:2] and CA [1:0], respectively, and the address AD [12:8] is allocated to the bank address BA [4:0]. Then, for each memory access request MREQ, data of 256B are input/output to/from the memories 31.

The data granularity corresponds to the number of bytes of data input or output consecutively to one bank BK based on one memory access request MREQ, and is determined by the bit position of the address AD to which the bank address BA [4:0] is allocated. The data granularity increases as the bank address BA [4:0] is allocated to the higher address AD. In other words, the address translation control circuit 60 illustrated in FIG. 4 changes the bits of the address AD to be allocated to the bank address (BA) based on the setting change request SREQ.

For example, since each access control circuit 80 and each memory 31 are connected by a 128-bit (16-byte) data line, the access control circuit 80 inputs/outputs data in units of 128 bits to the memories 31. Therefore, when the data granularity is 32B, the access control circuit 80 accesses the memories 31 twice in succession (burst length="2") based on the memory access request MREQ. When the data granularity is 64B, the access control circuit 80 accesses the memories 31 four times in succession (burst length="4") based on the memory access request MREQ. When the data granularity is 128B, the access control circuit 80 accesses the memories 31 eight times in succession (burst length="8") based on the memory access request MREQ. When the data granularity is 256B, the access control circuit 80 repeats the 8-times successive access to the memories 31 twice (burst length="8" access twice) based on the memory access request MREQ.

Figure 10:
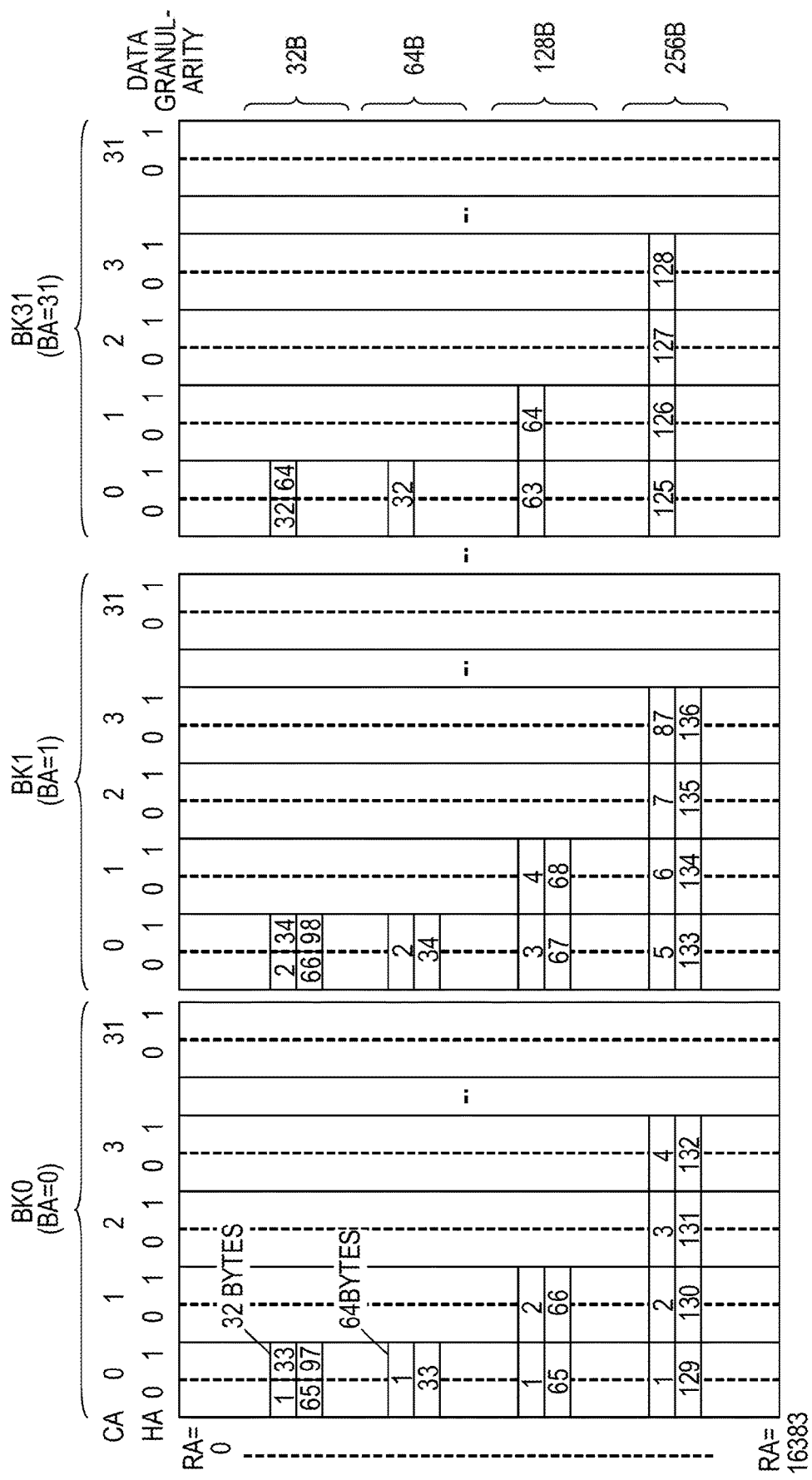
FIG. 10 is a view illustrating an example of memory access at each granularity of plural pieces of data illustrated in FIG. 9.

FIG. 10 illustrates an example of access to the memories 31 at each of the plural data granularities illustrated in FIG. 9. Each of the banks BK0 to BK31 has 16384 row areas identified by the row address RA (arranged in the vertical direction in FIG. 10), and each row area further includes 32 column areas identified by the column address CA (arranged in the horizontal direction in FIG. 10). In FIG. 10, the rectangles with numbers in the banks BK0 to BK31 indicate data input/output to/from the memories 31, and the numbers indicate the order of input or output when the address AD sequentially increases.

When the data granularity is 32B, since the bank address BA is allocated to the lowest bits of the address AD as illustrated in FIG. 9, every time the value of the address AD increases, the adjacent bank BK is sequentially accessed, and data of 32B are input or output for each bank BK. When the data granularity is 64B, the bank address BA is allocated to the lowest bits of the address AD except for the half address HA not used for access, as illustrated in FIG. 9. Therefore, every time the value of the address AD increases, the adjacent bank BK is sequentially accessed, and data of 64B are input or output for each bank BK.

When the data granularity is 128B, the bank address BA is allocated to one bit higher than the lowest bits of the address AD except for the half address HA not used for access, as illustrated in FIG. 9. Therefore, every time the value of the address AD increases by 2, the adjacent bank BK is sequentially accessed, and data of 128B are input or output for each bank BK. When the data granularity is 256B, the bank address BA is allocated to 2 bits higher than the lowest bits of the address AD except for the half address HA not used for access, as illustrated in FIG. 9. Therefore, every time the value of the address AD increases by 4, the adjacent bank BK is sequentially accessed, and data of 256B are input or output for each bank BK.

By changing the bits of the address AD to be allocated to the bank address BA based on the setting change request SREQ, it is possible to execute the access of data of each granularity within one bank BK, as illustrated in FIG. 10. Therefore, it is possible to access the data of each granularity without setting plural banks BK in an active state, thereby improving the access efficiency over a case of setting the plural banks BK in the active state.

Figure 11:
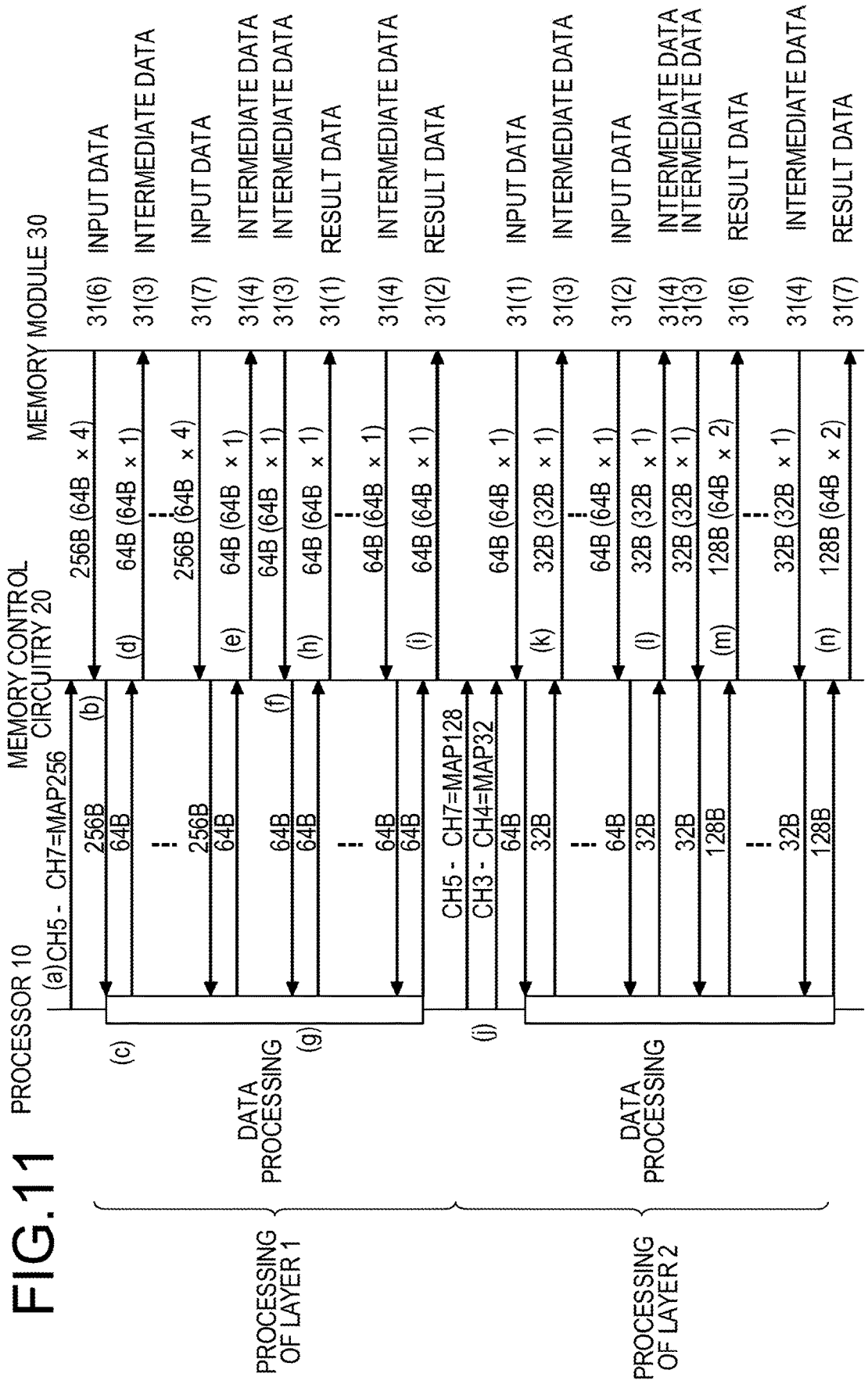
FIG. 11 is a view illustrating an example of the flow of processing illustrated in FIG. 8.

FIG. 11 illustrates an example of the flow of the processing illustrated in FIG. 8. The processing flow illustrated in FIG. 11 is implemented by the processor core 12 executing a program. Before starting the process illustrated in FIG. 11, the map information MAP64 corresponding to the data granularity="64B" in each of the channels CH0 to CH7 is set as allocation of the bits of the address AD. A minimal memory access is illustrated in FIG. 11 for the sake of easy understanding, but in actual processing, each of the input data, the intermediate data, and the result data has, for example, several megabytes (MB).

First, the processor 10 switches the allocation of the bits of the address AD of the channels CH5 to CH7 from the map information MAP64 to the map information MAP256 (see, e.g., section (a) of FIG. 11). Next, the processor 10 issues a memory access request MREQ for reading 256B data (input data) from the memory 31(6) connected to the channel CH6. The memory controller 20 accesses the memory 31(6) with the granularity="256B" and outputs the read data to the processor 10 (see, e.g., section (b) of FIG. 11). The processor 10 uses the data read from the memory 31(6) to execute data processing of layer 1, and generates intermediate data of 64B by the data processing (see, e.g., section (c) of FIG. 11).

The processor 10 issues a memory access request MREQ for writing intermediate data of 64B to the memory 31(3) connected to the channel CH3. The memory controller 20 stores the intermediate data of 64B transferred from the processor core 12 in the memory 31(3) with the granularity="64B" (see, e.g., section (d) of FIG. 11). Thereafter, the same processing as illustrated in sections (b) to (d) of FIG. 11 is repeatedly executed. Further, the channels CH7 and CH4 are used to execute reading of 256B data from the memory 31(7), processing of the read data, and writing of the intermediate data of 64B generated in the processing into the memory 31(4) (see, e.g., section (e) of FIG. 11).

Next, the processor 10 issues a memory access request MREQ for reading the intermediate data of 64B from the memory 31(3). The memory controller 20 accesses the memory 31(3) with the granularity="64B" and outputs the read data to the processor 10 (see, e.g., section (f) of FIG. 11). The processor 10 uses the intermediate data read from the memory 31(3) to execute data processing, and generates the result data of 64B by the data processing (see, e.g., section (g) of FIG. 11).

The processor 10 issues a memory access request MREQ for writing the result data of 64B in the memory 31(1) connected to the channel CH1. The memory controller 20 stores the result data of 64B transferred from the processor core 12 in the memory 31(1) with the granularity="64B" (see, e.g., section (h) of FIG. 11). Thereafter, the same processing as in sections (f) to (h) of FIG. 11 is repeatedly executed. Further, the channels CH4 and CH2 are used to execute reading of 64B intermediate data from the memory 31(4), processing of the read intermediate data, and writing of the result data of 64B generated in the processing into the memory 31(2) (see, e.g., section (i) of FIG. 11).

Next, the processor 10 switches the allocation of the bits of the address AD of the channels CH5 to CH7 from the map information MAP256 to the map information MAP128, and switches the allocation of the bits of the address AD of the channels CH3 and CH4 from the map information MAP64 to the map information MAP32 (see, e.g., section (j) of FIG. 11). Next, the processor 10 uses the channels CH1 and CH3 to execute reading of the data of 64B from the memory 31(1), processing of the read data, and writing of the intermediate data of 32B generated by the processing into the memory 31(3) (see, e.g., section (k) of FIG. 11). In addition, the processor 10 uses the channels CH2 and CH4 to execute reading of the data of 64B from the memory 31(2), processing of the read data, and writing of the intermediate data of 32B generated by the processing into the memory 31(4) (see, e.g., section (I) of FIG. 11). The memory controller 20 accesses the memories 31(1) and 31(2) with the granularity="64B" and accesses the memories 31(3) and 31(4) with the granularity="32B".

Thereafter, the processor 10 uses the channels CH3 and CH6 to execute reading of 64B intermediate data from the memory 31(3), processing of the read intermediate data, and writing of the result data of 128B generated in the processing into the memory 31(6) (see, e.g., section (m) of FIG. 11). In addition, the processor 10 uses the channels CH4 and CH7 to execute reading of 64B intermediate data from the memory 31(4), processing of the read intermediate data, and writing of the result data of 128B generated in the processing into the memory 31(7) (see, e.g., section (n) of FIG. 11). The memory controller 20 accesses the memories 31(3) and 31(6) with the granularity="32B" and accesses the memories 31(6) and 31(7) with the granularity="128B". Then, the processing of layer 2 is completed.

Figure 12:
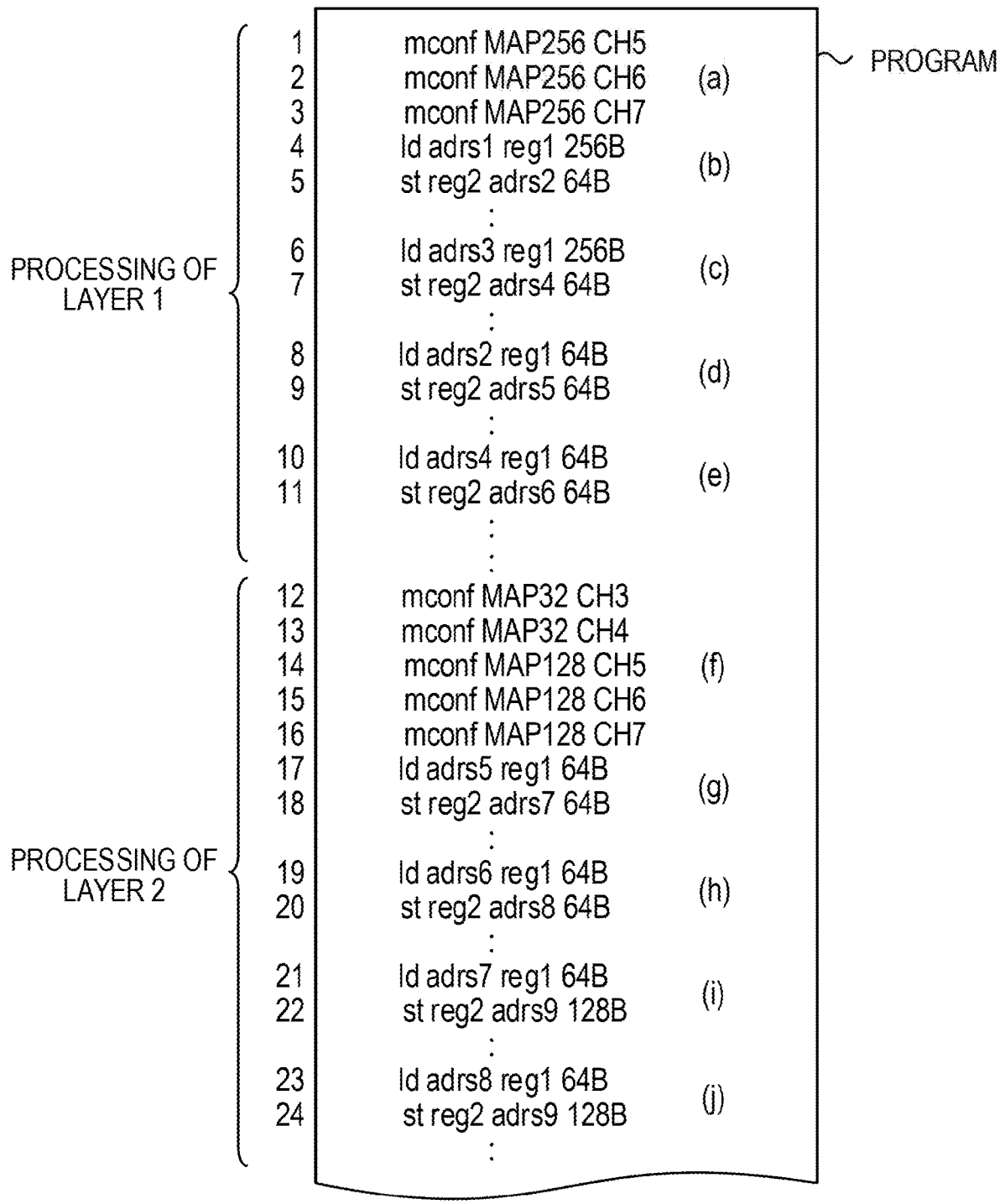
FIG. 12 is a view illustrating an example of a program for executing the processing illustrated in FIG. 11.

FIG. 12 illustrates an example of a program for executing the processing illustrated in FIG. 11. The program illustrated in FIG. 12 is executed by the processor core 12. Numbers attached to the left side of the program indicate line numbers for explanation. Symbols (a) to (I) in the program correspond to the symbols in FIG. 11, which are not for program description. A setting change command for changing the allocation of the bits of the address AD is described in a row including an instruction code (mconf), as described with reference to FIG. 6. The minimum number of instructions is illustrated in FIG. 12 for the sake of easy understanding, but in actual programs, a large number of load instructions and a large number of store instructions are described.

First, in the processing of layer 1, a setting change command for switching the allocation of the bits of the address AD of the channels CH5 to CH7 to the map information MAP256 is described in the 1st to 3rd rows (see, e.g., section (a) of FIG. 12). In the 4th to 7th rows, the process of reading data from the memories 31 by the load instruction (Id), processing the read data, and writing the intermediate data obtained by the processing into the memories 31 by the store instruction (st) is repeatedly executed (see, e.g., sections (b) and (c) of FIG. 12). Although not illustrated in FIG. 12, plural arithmetic instructions for processing data are described between the 4th row and the 5th row and between the 6th row and the 7th row. For example, the data to be processed is read from the memory 31(6) or 31(7) into a register in 256B units, and the intermediate data are read from the register into the memory 31(3) or 31(4) in 64B units.

In the eighth to eleventh rows, the process of reading intermediate data from the memories 31 by the load instruction (Id), processing the read intermediate data, and writing the result data obtained by the processing into the memories 31 by the store instruction (st) is repeatedly executed (see, e.g., sections (d) and (e) of FIG. 12). For example, the intermediate data to be processed are read from the memory 31(3) or 31(4) into the register in 64B units and the result data are written from the register into the memory 31(1) or 31(2) in 64B units. Although not illustrated in FIG. 12, plural arithmetic instructions for processing data are described between the 8th row and the 9th row and between the 10th row and the 11th row.

Next, in the processing of layer 2, first, a setting change command for switching the allocation of the bits of the address AD of the channels CH3 and CH4 to the map information MAP32 is described in the twelfth and thirteenth rows. In addition, a setting change command for switching the allocation of the bits of the address AD of the channels CH5 to CH7 to the map information MAP128 is described in the 14th to 16th rows (see, e.g., section (f) of FIG. 12).

In the 17th to 20th rows, the process of reading data from the memories 31 by the load instruction (Id), processing the read data, and writing the intermediate data obtained by the processing into the memories 31 by the store instruction (st) is repeatedly executed (see, e.g., sections (g) and (h) of FIG. 12). For example, as data to be processed, the result data of the processing of layer 1 are read from the memory 31(1) or 31(2) into the register in 64B units. The intermediate data generated by the processing of layer 2 are written from the register into the memory 31(3) or 31(4) in 32B units.

In the 21th to 24th rows, the process of reading intermediate data from the memories 31 by the load instruction (Id), processing the read intermediate data, and writing the result data obtained by the processing into the memories 31 by the store instruction (st) is repeatedly executed (see, e.g., sections (i) and (j) of FIG. 12). For example, the intermediate data to be processed are read from the memory 31(3) or 31(4) into the register in 32B units and the result data are written from the register into the memory 31(6) or 31(7) in 128B units. Although not illustrated in FIG. 12, plural arithmetic instructions for processing data are described between the 17th row and the 18th row, between the 19th row and the 20th row, between the 21st row and the 22rd row, and between the 23rd row and the 24th row.

FIG. 13 illustrates the outline of control of the request queue 74 by the queue control circuit 70 illustrated in FIG. 5. In FIG. 13, the rectangles in the request queue 74 indicate the entry ENT, and the numbers attached to each entry ENT indicate the order stored in the entry ENT.

Section (A) of FIG. 13 illustrates an example of control of the request queue 74 when the map information MAP is not switched, that is, when the data granularity is always constant with unchanged. For example, when the request queue 74 holds the same memory access request MREQ for a bank BK to be accessed, the request output control circuit 79 illustrated in FIG. 5 fetches the memory access request MREQ from the request queue 74 so that memory accesses to each bank BK are consecutive.

For example, the memory access request MREQ (WR, BA1) stored fifth in the request queue 74 overtakes the memory access request MREQ stored second to fourth, and is processed following the first memory access request MREQ (WR, BA1). This makes it possible to minimize the number of times to activate the bank BK (the number of active commands issued), thereby improving the use efficiency of a memory bus over a case where the memory access request MREQ is not overtaken.

Section (B) of FIG. 13 illustrates an example in which the data granularity is changed by switching the map information MAP and the request queue 74 is controlled without using a group flag GF. For example, after the fourth memory access request MREQ is stored in the request queue 74, the map information MAP is switched to change the granularity of data to be input/output to/from the memories 31. The first to fourth memory access requests MREQ are accessed with the data granularity of "256", and the fifth and sixth memory access requests MREQ are accessed with the data granularity of "64".

In FIG. 13B, the request output control circuit 79 processes, for example, the memory access request MREQ (WR, BA2) stored fifth in the request queue 74 third so that the memory access to each bank BK is continuous. Here, it is assumed that the memory access request MREQ (RD, BA2) stored third in the request queue 74 and the memory access request MREQ (WR, BA2) stored fifth in the request queue 74 refer to the same memory area of the memories 31. The data granularity differs between the third write access and the fourth read access. For this reason, the fourth read access may read data written in an incorrect position by the third write access. That is, when controlling the request queue 74 without using the group flag GF, the memory controller 20 may malfunction.

Section (C) of FIG. 13 illustrates an example in which the data granularity is changed by switching the map information MAP and the request queue 74 is controlled using the group flag GF. The contents of the memory access request MREQ stored in the request queue 74, the timing at which the map information MAP is switched, and the switched map information MAP are the same as those in section (B) of FIG. 13.

In section (C) of FIG. 13, the request output control circuit 79 attempts to overtake processing of the memory access request MREQ stored in the request queue 74 so that the memory access to each bank BK is continuous. However, the request output control circuit 79 prohibits the overtaking processing of the memory access request MREQ having different values of the group flag GF. In other words, the overtaking processing of the memory access request MREQ is executed between the memory access requests MREQ having the same value of the group flag GF. Therefore, there is no possibility that the memory access request MREQ (WR, BA2) stored fifth in the request queue 74 is processed before the memory access request MREQ (RD, BA2) stored third in the request queue 74. That is, by using the group flag GF to control the overtaking processing of the memory access request MREQ, malfunction of the memory controller 20 illustrated in section (B) of FIG. 13 may be suppressed.

As described above, in the embodiment illustrated in FIGS. 4 to 13, as in the embodiment illustrated in FIG. 1, the granularity of data input/output to/from the memories 31 may be changed dynamically for each memory 31 in accordance with the processing of a program executed by the processor 10. As a result, the efficiency of access to the memories 31 may be improved over a case where the data granularity is not changed, which may result in improvement of the processing performance of the information processing apparatus 100A.

Further, the embodiment illustrated in FIGS. 4 to 13 may achieve the following effects. Specifically, by selecting one of the map information MAP based on the setting change request SREQ, the allocation of the bits of the address AD (i.e., the data granularity) may be more easily changed than a case of generating the map information MAP based on the setting change request SREQ. In addition, the map information MAP may be output to the address translation circuit 66 faster than a case of generating the map information MAP based on the setting change request SREQ.

By inhibiting replacement (overtaking) of the output order of the memory access request MREQ to the access control circuit 80 between memory access requests MREQ having different values of the group flag GF, malfunction of the memory controller 20 may be suppressed. By providing the request decoder 40, even when the memory controller 20 has plural memory control circuits 50, it is possible to output the memory access request MREQ to a memory control circuit 50 corresponding to a memory 31 to be accessed. Further, by providing the request decoder 40, even when the memory controller 20 has plural memory control circuits 50, it is possible to output the setting change request SREQ to a memory control circuit 50 of a change target of the map information MAP. Furthermore, by setting the minimum number of banks BK to the active state, it is possible to access the data of each granularity, thereby improving the access efficiency over a case of setting the plural banks BK in the active state.

Figure 14:
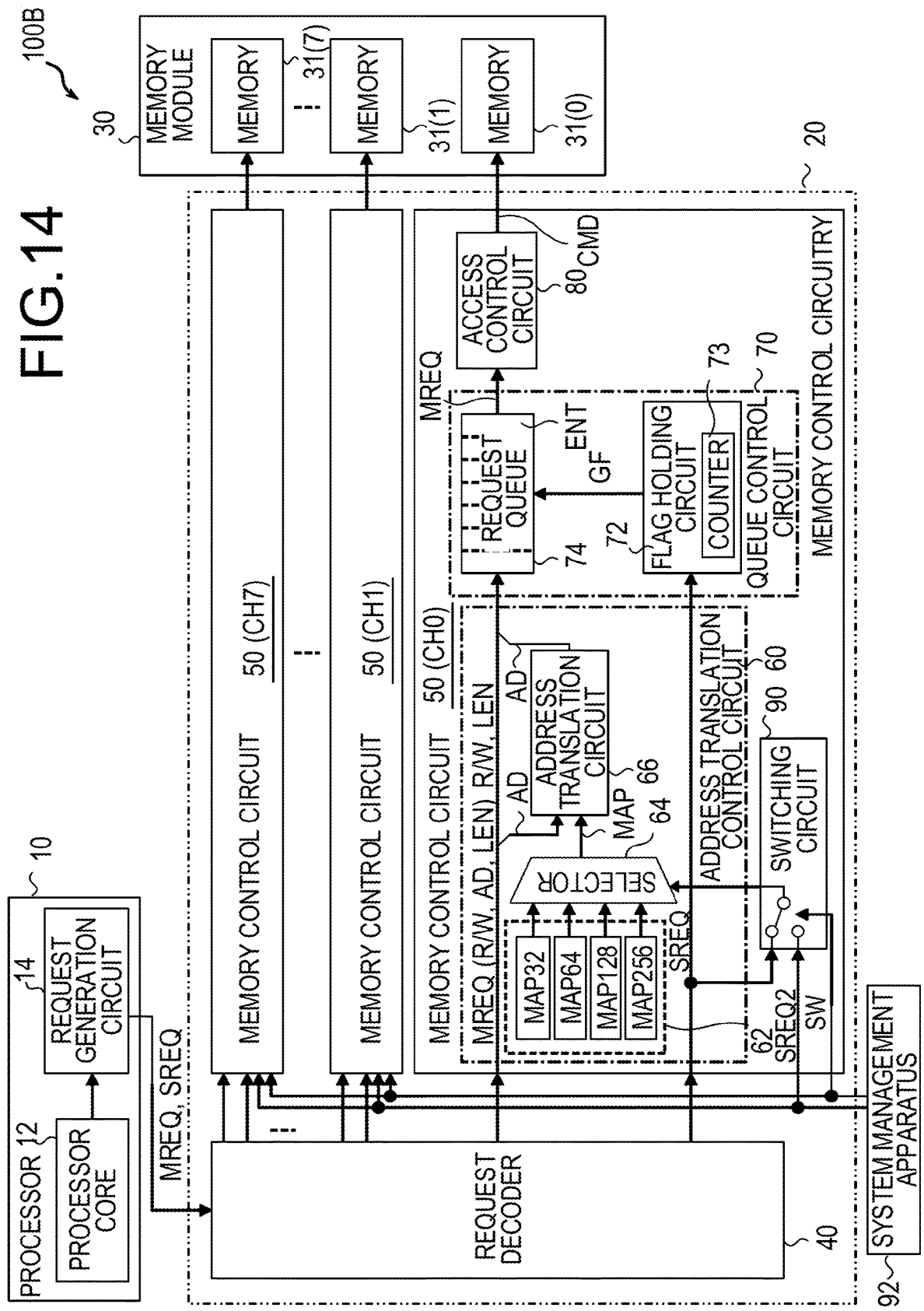
FIG. 14 is a view illustrating an information processing apparatus, a memory control circuitry, and a control method of the information processing apparatus according to another embodiment.

FIG. 14 illustrates an information processing apparatus, a memory control circuitry, and a control method of the information processing apparatus according to another embodiment. The same or similar elements as those in FIG. 4 are denoted by the same reference numerals and detailed explanation thereof will not be repeated.

In the information processing apparatus 100B illustrated in FIG. 14, a switching circuit 90 is added to each memory control circuit 50 illustrated in FIG. 4. Further, the information processing apparatus 100B includes a system management device 92 that manages the operation of the information processing apparatus 100B. The system management device 92 is an example of another device. Note that the system management device 92 may be installed outside the information processing apparatus 100B. The other configuration of the information processing apparatus 100B is the same as that of the information processing apparatus 100A illustrated in FIG. 4.

The switching circuit 90 selects one of the setting change request SREQ output from the request decoder 40 and a setting change request SREQ2 output from the system management device 92 according to the switching information SW output from the system management device 92 and outputs the selected one to the selector 64. When causing the address translation circuit 66 to change the allocation of the bits of the address AD, the system management device 92 outputs the switching information SW to the switching circuit 90 and connects a transfer path of the setting change request SREQ2 and the selector 64 via the switching circuit 90. Then, the system management device 92 outputs the setting change request SREQ2 to the selector 64 and causes the address translation circuit 66 to change the allocation of the bits of the address AD. In addition, the system management device 92 may output the switching information SW and the setting change request SREQ2 independently to each of the plural memory control circuits 50 and may cause the address translation circuit 66 of the memory control circuit 50 to individually change the allocation of the bits of the address AD.

By changing the allocation of the bits of the address AD by the system management device 92, it is possible to set the predetermined map information MAP in each memory control circuit 50, for example, in the initialization processing of the information processing apparatus 100B. Alternatively, it is possible to set the predetermined map information MAP in each memory control circuit 50, for example, in a test mode. That is, it is possible to set the predetermined map information MAP in each memory control circuit 50 without executing a program.

As described above, the embodiment illustrated in FIG. 14 may achieve the same effects as the embodiment illustrated in FIGS. 1 to 13. For example, by dynamically changing the granularity of data input/output to/from the memories 31 for each memory 31 by a program executed by the processor 10, the efficiency of access to the memories 31 may be improved, which may result in improvement of processing performance of the information processing apparatus 100B. Further, in the embodiment illustrated in FIG. 14, each memory control circuit 50 is provided with the switching circuit 90 that selectively supplies the setting change requests SREQ and SREQ2 to the selector 64, so that the map information MAP of each memory control circuit 50 may be switched without executing a program.

Figure 15:
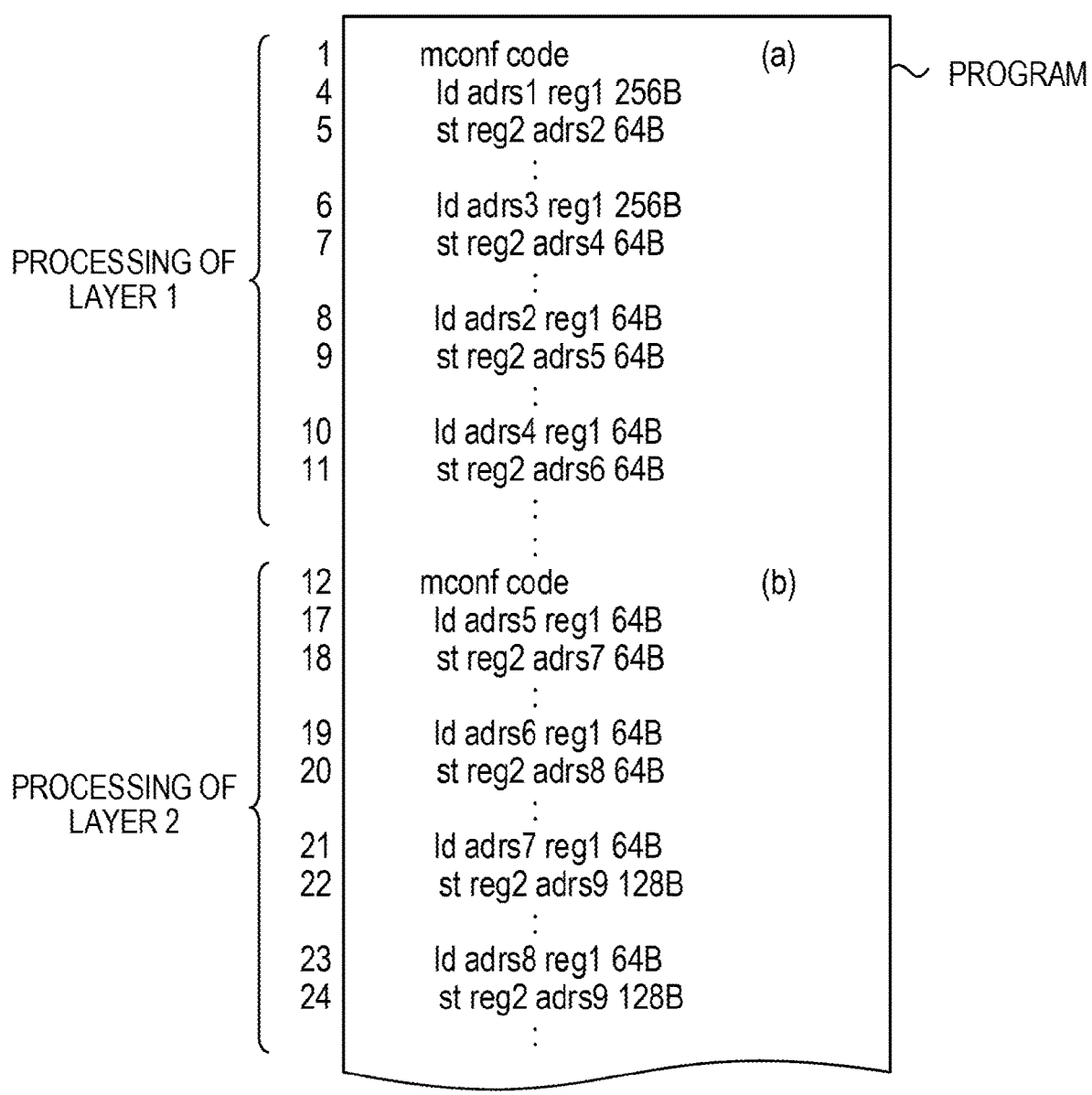
FIG. 15 is a view illustrating an example of a program executed by a processor core in an information processing apparatus, a memory control circuitry, and a control method of the information processing apparatus according to another embodiment.

FIG. 15 illustrates an example of a program executed by a processor core in an information processing apparatus, a memory control circuitry, and a control method of the information processing apparatus according to another embodiment. The same or similar elements as those in FIGS. 1 to 14 are denoted by the same reference numerals and detailed explanation thereof will not be repeated.

In FIG. 15, one mconf instruction (mconf code) is described instead of the mconf instruction in the first to third rows of the program illustrated in FIG. 12 (see, e.g., section (a) of FIG. 15). In addition, one mconf instruction (mconf code) is described instead of the mconf instruction in the 12th to 16th rows of the program illustrated in FIG. 12 (see, e.g., section (b) of FIG. 15). The other description of the program is the same as that in FIG. 12.

The program illustrated in FIG. 15 is executed by the processor 10 illustrated in FIG. 4 or FIG. 14. An information processing apparatus that executes the program illustrated in FIG. 15 has the same configuration as the information processing apparatus 100A illustrated in FIG. 4 or the information processing apparatus 100B illustrated in FIG. 14, except that the request generation circuit 14 and the request decoder 40.

Figure 16:
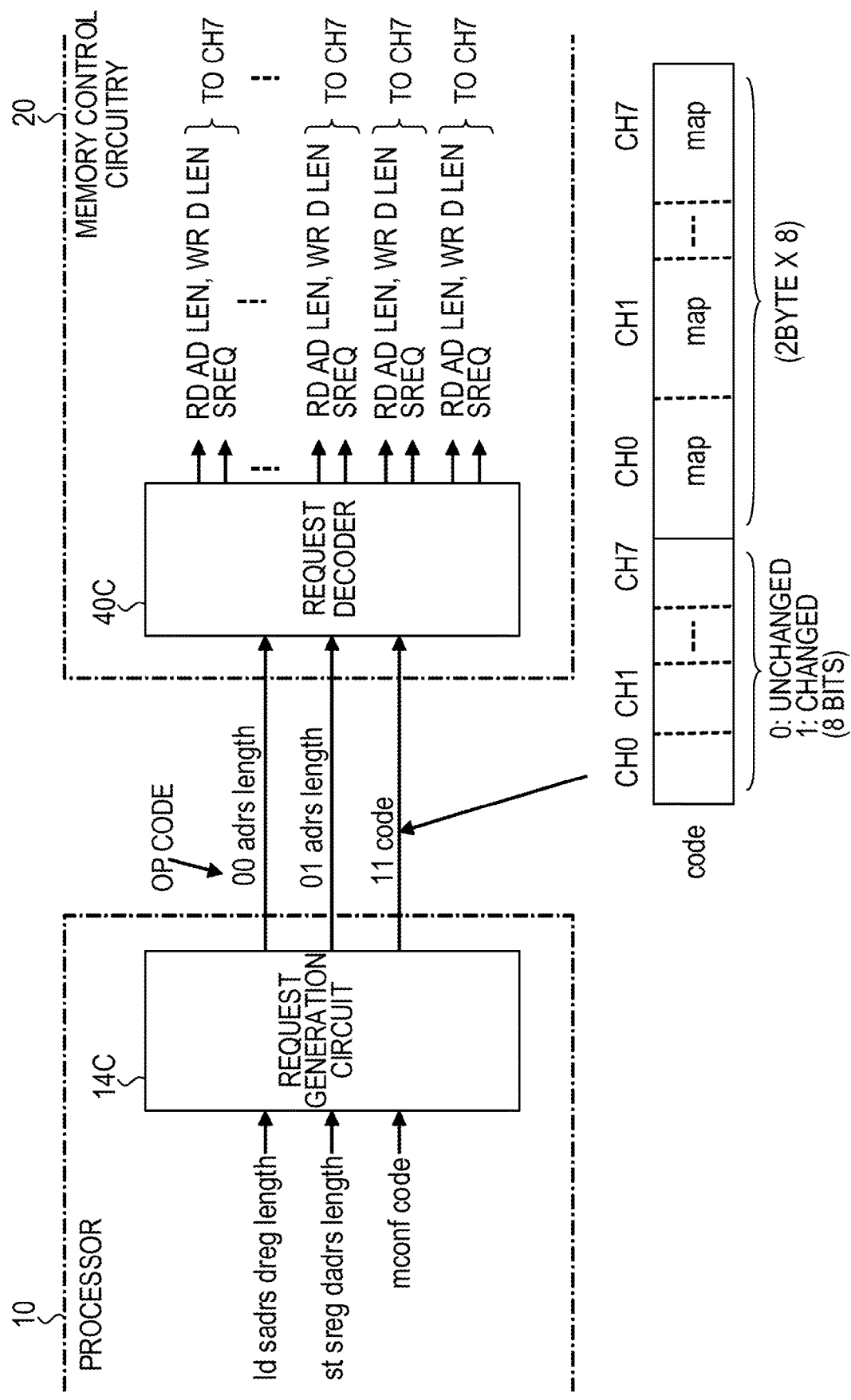
FIG. 16 is a view illustrating an example of the operations of a request generation circuit and a request decoder of the information processing apparatus that executes the program illustrated in FIG. 15.

FIG. 16 illustrates an example of the operation of a request generation circuit 14C and a request decoder 40C of the information processing apparatus that executes the program illustrated in FIG. 15. When receiving a setting change instruction "mconf code", the request generation circuit 14C outputs OP codes "11" and "code" indicating the setting change instruction to the request decoder 40C. The "code" includes information (8 bits) indicating the presence or absence of change of allocation of the bits of the address AD and allocation information map (16 bits) for each of the channels CH0 to CH7. That is, in FIG. 16, it is possible to change the allocation (i.e., the data granularity) of the bits of the address AD of all the memory control circuits 50 by one setting change command "mconf". The allocation information map indicates the granularity "32B" when it is "00" in binary number, the granularity "64B" when it is "01" in binary number, the granularity "128B" when it is "10" in binary number, and the granularity "256B" when it is "11" in binary number. The operation of the request generation circuit 14 C when receiving the codes Id and st is the same as the operation of the request generation circuit 14 illustrated in FIG. 6.

When receiving the operation codes "11" and "code" from the request generation circuit 14C, the request decoder 40C outputs the setting change request SREQ including information indicating the allocation information map to a channel CH that changes the allocation of the bits of the address AD, based on the information included in the "code". The operation of the request decoder 40C when detecting a load instruction or a store instruction is the same as the operation of the request decoder 40 illustrated in FIG. 6.

As described above, the embodiment illustrated in FIGS. 15 and 16 may achieve the same effects as the embodiment illustrated in FIGS. 1 to 14. Further, the embodiment illustrated in FIGS. 15 and 16 may achieve the following effects. Specifically, the allocation of the bits of the address AD may be changed in all the memory control circuits 50 by one setting change command "mconf", and the number of setting change commands "mconf" described in the program may be reduced as compared with that in FIG. 6. As a result, it is possible to shorten the time required to change the allocation (i.e., the data granularity) of the bits of the address AD as compared with that in FIG. 6, which may result in improvement of the processing performance of the information processing apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a processor configured to execute arithmetic processing using a plurality of layers of a neural network;
a plurality of memories configured to store data which is used in the respective layers of the neural network and each including a plurality of banks; and
a memory control circuitry coupled to the processor and the plurality of memories, configured to control an access to the plurality of memories based on a memory access request from the processor and including a plurality of memory control circuits corresponding respectively to the plurality of memories, and a request distribution circuit, the processor is configured to receive a setting change request to change a setting of one of the plurality of memory control circuits and output the setting change request to the request distribution circuit, the request distribution circuit is configured to output the memory access request and the setting change request from the processor to one of the plurality of memory control circuits, each of the plurality of memory control circuits is configured to:
  receive the memory access request and the setting change request;
  allocate a bank address to bits of an address included in the memory access request which are determined based on the setting change request; and
  read a number of data consecutively from each of the banks of the corresponding memory based on the allocated memory access request in which the bank address is allocated to the bits.

2. The information processing apparatus according to claim 1, wherein the each of the plurality of memory control circuits is configured to:
  hold a plurality of allocation information indicating allocation of bits of an address;
  select one of the plurality of allocation information based on the setting change request; and
  allocate the bank address to the bits of the address included in the memory access request based on the selected allocation information.

3. The information processing apparatus according to claim 2, wherein each of the plurality of memory control circuits is configured to receive one of the setting change request from the processor and a setting change request from another device.

4. The information processing apparatus according to claim 1, wherein each of the plurality of memory control circuits is configured to:
  hold a flag value;
  update the held flag value each time the setting change request is received from the processor;
  store a plurality of entries in which the allocated memory access request is stored together with the flag value; and
  permit a replacement of an order of output of a plurality of allocated memory access requests respectively held in the plurality of entries holding the same flag value to the corresponding memory; and
  prohibit replacement of the order of output of the plurality of allocated memory access requests respectively held in the plurality of entries holding different flag values to the corresponding memory.

5. The information processing apparatus according to claim 1, wherein, when receiving the memory access request, the request distribution circuit outputs the received memory access request to a memory control circuit corresponding to a memory to which an address included in the memory access request is allocated, among the plurality of memory control circuits, and when receiving the setting change request, the request distribution circuit outputs the received setting change request to a memory control circuit indicated by change destination information included in the setting change request, among the plurality of memory control circuits.

6. The information processing apparatus according to claim 1, wherein the address included in the memory access request includes the bank address that selects a bank to be accessed, among the plurality of banks of each of the plurality of memories, and an internal address that selects a memory area to be accessed, among a plurality of memory areas of each of the plurality of banks.

7. A memory control circuitry comprising:
  a plurality of memory control circuits corresponding respectively to a plurality of memories configured to store data which is used in respective layers of a neural network and each including a plurality of banks; and
  a request distribution circuit that outputs a memory access request and a setting change request to change a setting of one of the plurality of memory control circuits from the processor to one of the plurality of memory control circuits,
  the request distribution circuit is configured to output the memory access request and the setting change request from the processor to one of the plurality of memory control circuits,
  each of the plurality of memory control circuits is configured to:
    receive the memory access request and the setting change request;
    allocate a bank address to bits of an address included in the memory access request which are determined based on the setting change request; and
    read a number of data consecutively from each of the banks of the corresponding memory based on the allocated memory access request in which the bank address is allocated to the bits.

8. A control method of an information processing apparatus comprising:
  causing a request distribution circuit included in a memory control circuitry, which controls access to a plurality of memories and includes a plurality of memory control circuits corresponding respectively to a plurality of memories configured to store data which is used in respective layers of a neural network and each including a plurality of banks, to output a memory access request and a setting change request to change a setting of one of the plurality of memory control circuits from the processor to one of the plurality of memory control circuits; and
  causing the plurality of memory control circuits to:
    receive the memory access request and the setting change request;
    allocate a bank address to bits of an address included in the memory access request which are determined based on the setting change request; and
    read a number of data consecutively from each of the banks of the corresponding memory based on the allocated memory access request in which the bank address is allocated to the bits.

* * * * *